United States Patent [19]
Beene et al.

[11] 4,081,609
[45] Mar. 28, 1978

[54] SYNCHRONOUS RING DETECTOR FOR STATION CARRIER TELEPHONE SYSTEMS

[75] Inventors: Gerald Wayne Beene; Hubert C. Martin, Jr., both of Arlington, Tex.

[73] Assignee: Reliance Telecommunication Electronics Company, Euless, Tex.

[21] Appl. No.: 763,520

[22] Filed: Jan. 28, 1977

[51] Int. Cl.² .............................................. H04H 1/04
[52] U.S. Cl. ............................ 179/2.5 R; 179/84 SS
[58] Field of Search ............. 179/2.5 R, 84 R, 84 SS, 179/15 FD, 15 BP; 325/55, 64

[56] References Cited
U.S. PATENT DOCUMENTS 4,002,838  1/1977  Bosik .................................. 179/2.5 R Primary Examiner—Kathleen H. Claffy
Assistant Examiner—Joseph A. Popek
Attorney, Agent, or Firm—Strauch, Nolan, Neale, Nies & Kurz

[57] ABSTRACT

A plural channel amplitude modulated station carrier signalling circuit in which an incoming call for a subscriber served by the station carrier system is sensed at the called subscriber's subscriber channel terminal circuit by synchronously detecting a signal which originates from a central office to signal the incoming call for the subscriber.

4 Claims, 18 Drawing Figures

SYNCHRONOUS RING DETECTOR FOR STATION CARRIER TELEPHONE SYSTEMS

FIELD OF THE INVENTION

This invention relates to plural channel amplitude modulated station carrier telephone systems (sometimes referred to as subscriber carrier sytems) and is particularly concerned with plural channel amplitude modulated station carrier signalling circuits for signalling an incoming call for a subscriber.

BACKGROUND

One of the foremost considerations in the design of multi-channel station carrier systems is cost in order to make such equipment an economically attractive alternative to physical pairs. At the same time there is continuing need to improve the performance of station carrier systems.

One factor contributing to the cost of station carrier equipment is the use of tuned, narrow bandpass filters to sense a signalling tone which is transmitted over the called subscriber's channel to signal an incoming call for the subscriber. These tuned bandpass filters are customarily designed with one or more costly coils for recovering the transmitted signalling tone.

In the type of signalling operation employing such bandpass filters a relatively low frequency tone (e.g., 750Hz) is customarily modulated onto the carrier system's channel to be rung and is transmitted down the transmission line to the subscriber terminal equipment in the station carrier system. Each of the subscriber channel terminals in the carrier system is equipped with one of the narrow bandpass filters mentioned above to sense the low frequency tone when the tone is modulated onto its particular channel. Upon sensing the tone additional equipment is operated to ring the subscriber's telephone.

In such a system, annoying bell taps may be caused by transients emanating from lightning or other sources. To avoid bell taps some station carrier systems are equipped with circuits that suppress the transients, but not the low frequency signalling tone. Such circuits, however, add to the expense of the station carrier equipment.

SUMMARY AND OBJECTS OF INVENTION

An important object of this invention is to provide a novel station carrier signalling circuit for signalling an incoming call for a subscriber. The carrier signalling circuit of this invention minimizes bell tapping and eliminates the need for equipping subscriber terminals with relatively expensive bandpass filters for sensing the transmission of a signalling tone.

The present invention is generally applicable to a plural channel amplitude modulated station carrier system having a signal transmission line interconnecting a plurality of central office transmitting and receiving channel terminal circuits at a central ofice and a like plurality of remotely located subscriber transmitting and receiving channel terminal circuits. Each of the central office and subscriber terminal circuits has a transmitter equipped to transmit an amplitude modulated carrier signal of pre-selected frequency and a receiver tuned to receive an amplitude modulated carrier signal of different pre-selected frequency. Each subscriber terminal circuit is paired with a different one of the central office terminal circuits and is connected to a subscriber's telephone to provide service for the subscriber. The carrier signals transmitted and received in the station carrier system are frequency division multiplexed to enable the non-interfacing transmission of the carrier signals in both directions over the same transmission line.

According to this invention, signalling of an incoming call for one of the subscribers served by the station carrier system is accomplished by modulating the called subscriber's central transmit channel (i.e., the central office channel carrier signal assigned to the called subscriber) with an a.c. signal of preselected frequency (hereinafter referred to as a signalling tone) and by additionally modulating a pilot carrier signal with the same signalling tone. The signalling tone modulations on the pilot carrier signal and the channel carrier signal are required to be in phase with each other or 180° out of phase with each other upon reception at the subscriber terminal equipment. In further accordance with this invention, the transmitted signalling tone modulation, upon being recovered at the subscriber terminal equipment, is synchronously detected by means of a synchronous detector in the called subscriber's subscriber terminal circuit. The synchronous detection of the recovered signalling tones causes operation of additional equipment in the subscriber's terminal circuit to ring the subscriber's telephone. The signalling tone applied to modulate the channel and pilot carrier signal lies within the passband of the carrier channel equipment, but may be either within the channel voice band or just outside it.

The foregoing synchronous ring detection scheme of this invention thus eliminates the need for equipping the subscriber channel terminal circuits with relatively expensive bandpass filtering for sensing the presence of the signalling tone, and it additionally minimizes bell taps.

In the illustrated embodiment, the present invention is incorporated into a station carrier communication system or facility having an array of amplitude modulated plural channel carrier sub-systems in which each carrier sub-system has its own transmission line for connecting a plurality of central office transmitting and receiving channel terminal circuits with a like plurality of subscriber transmitting and receiving channel terminal circuits.

In the illustrated embodiment the pilot carrier signal to be modulated by the signalling tone is transmitted over the transmission line of each carrier sub-system. A receiver forming a part of the subscriber terminal equipment is common to the subsystems in the communication facility and is tuned to receive any one of the pilot signals that are transmitted over the sub-systems' transmission lines. A search and lock circuit in the subscriber terminal equipment serves to select one of the stronger transmitted pilot signals for reception by the pilot signal receiver.

The pilot signal receiver detects the transmitted pilot signal that is fed thereto by the search and lock circuit and recovers the signalling tone modulation. From the pilot signal receiver the recovered signalling tone is distributed to the synchronous ring detectors in the subscriber channel terminal circuits.

At the same time that the signalling tone is recovered by the pilot carrier receiver and distributed to the synchronous ring detectors in the subscriber channel terminal circuits, only the called subscriber's channel will be modulated with the signalling tone and will be recoverd in the called subscriber's subscriber channel terminal circuit separately from the recovery of the signalling tone from pilot signal in the pilot signal receiver. When the signalling tone is recovered from both of these sources at the same time, it will be synchronously detected to cause the additional circuitry to ring the called subscriber's telephone.

With the foregoing in mind, further important objects of this invention are the provision of a station carrier system in which:

1. A signalling tone for signalling an incoming call for a subscriber served by the station carrier system is synchronously detected.

2. The synchronous detection of the signalling tone is accomplished by equipping each subscriber channel terminal circuit with a synchronous detector, by modulating both a pilot carrier signal and the called subscriber's channel with the signalling tone, by separating recovering the signalling tone modulation from the pilot carrier signal and from the called subscriber's channel and by feeding the recovered signalling tone modulations to the synchronous detector in the called subscriber's subscriber channel terminal circuit for synchronous detection.

Further objects of this invention will appear as the description proceeds in connection with the appended claims and the below-described drawings.

DETAILED DESCRIPTION

Figure 1A:
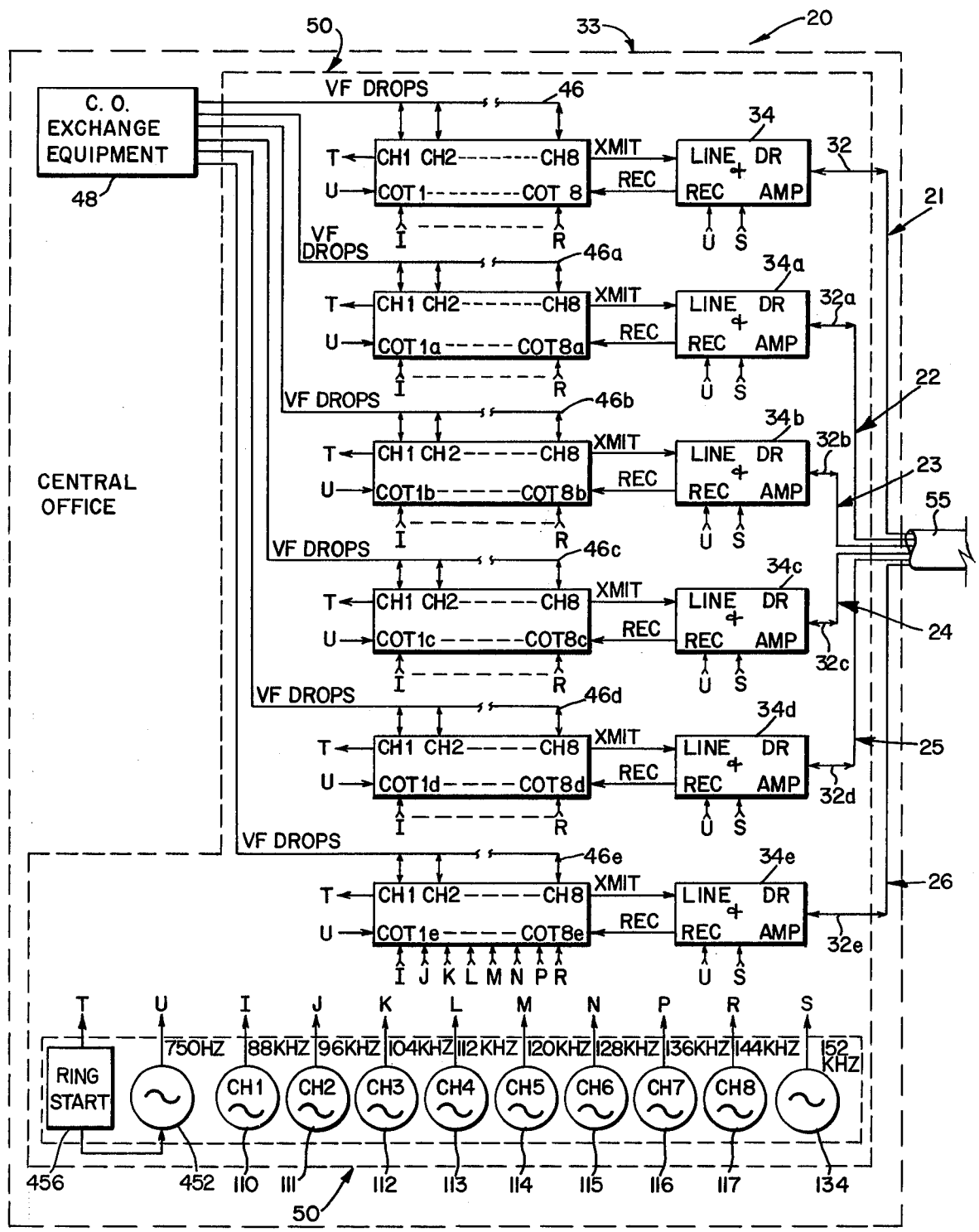
FIGS. 1A and 1B show a schematic block diagram of a station carrier communication facility incorporating the principles of this invention, with FIG. 1B being a continuation of FIG. 1A.
Figure 1B:
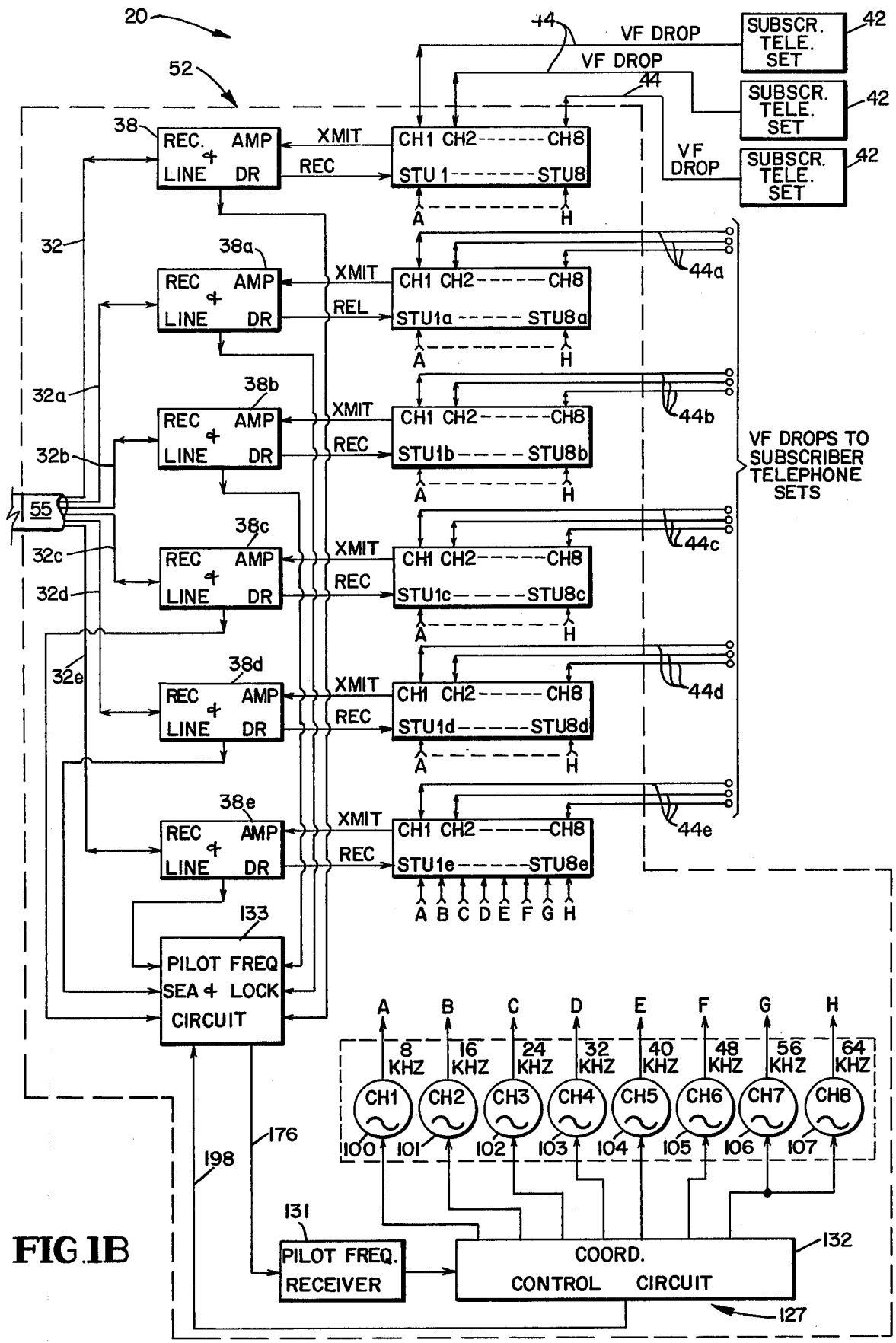

Referring to FIGS. 1A and 1B, one embodiment of a station carrier communication system or facility (indicated at 20 in the drawings) incorporating the principles of this invention is shown to comprise an array or group of individual multichannel, frequency division multiplexed, amplitude modulated carrier sub-systems and certain equipment, to be described later, common to the carrier sub-systems. The number of individual station carrier sub-systems employed in the overall communication facility 20 is usually selected in accordance with the number of subscribers requiring service. In the illustrated example, six individual carrier sub-systems are shown as indicated at 21, 22, 23, 24, 25 and 26 in FIGS. 1A and 1B.

Figure 2:
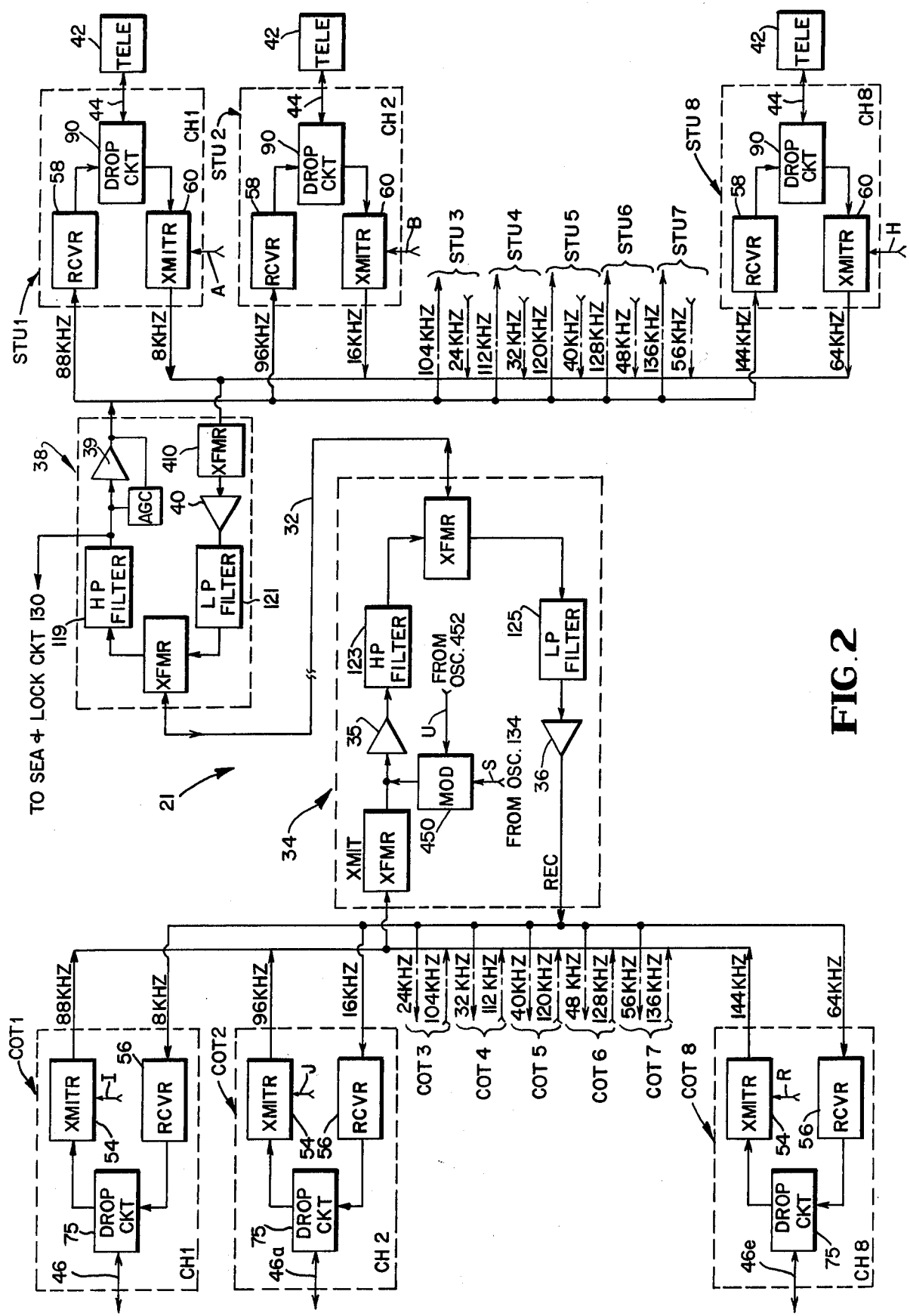
FIG. 2 is a schematic block diagram of one of the station carrier sub-systems shown in FIGS. 1A and 1B.

As shown in FIGS. 1A, 1B and 2, sub-system 21 generally comprises a single two-conductor transmission line 32, a selected number of central office transmitting and receiving terminal circuits, and a corresponding number of subscriber transmitting and receiving circuits. Any suitable number of central office and subscriber transmitting and receiving terminal circuits may be employed. For example, eight central office transmitting and receiving terminal circuits and eight subscriber transmitting and receiving circuits may be employed as shown to make up an eight-channel sub-system. The central office transmitting and receiving terminal circuits are indicated at COT1, COT2, COT3, COT4, COT5, COT6, COT7 and COT8. The subscriber transmitting and receiving terminal circuits are indicated in the drawings at STU1, STU2, STU3, STU4, STU5, STU6, STU7 and STU8.

As will be described in greater detail later on, each of the central office terminal circuits COT1–COT8 comprises a communications transmitter 54 (see FIG. 2) for transmitting a carrier signal of pre-selected frequency and a communications receiver 56 (see FIG. 2) tuned to receive a carrier signal from only a pre-selected one of the subscriber terminal circuits. Likewise, the subscriber terminal circuits STU1–STU8 each includes a communications receiver 58 (see FIG. 2) tuned to receive a carrier signal from only a pre-selected one of the central office terminal circuits and a transmitter 60 (see FIG. 2) for transmitting a carrier signal of pre-selected frequency.

Each of the subscriber terminal circuits STU1–STU8 is paired with a different one of the central office terminal circuits COT1–COT8 to provide eight two-way transmission channels. It is understood that each of these transmission channels has two different allocated frequency bands to provide service for a subscriber, one band being for transmission in one direction from the central office terminal equipment to the subscriber terminal equipment, and the other band being for transmission in the opposite direction from the subscriber terminal equipment to the central office terminal equipment. In this example, the subscriber terminal circuits STU1–

STU8 are respectively paired with the central office terminal circuits COT1–COT8. The transmission channels are designated by the reference characters CH1–CH8. The frequency spacing between adjacent carrier signals transmitted in either direction may be 8kHz.

The central office terminal circuits COT1–COT8 are located at a central office or central office station which is generally indicated at 33 in FIG. 1. The subscriber transmitting and receiving circuits STU1–STU8 are located remotely from central office 33 at the subscriber end of the transmission line 32. The transmitters and receivers in each of the terminal circuits COT1–COT8 are connected to line 32 by way of suitable line coupling equipment such as a line driver and receive amplifier unit 34 in the central office.

Unit 34 is a four-wire circuit, providing separate transmit and receive signal paths, one for feeding the central office transmitted carrier signals from the transmitters in the central office terminal circuits COT1–COT8 to transmission line 32, and the other for feeding the subscriber-transmitted carrier signals from transmission line 32 to the receivers in the central office terminal circuits COT1–COT8. Unit 34 advantageously has a pair of amplifiers 35 and 36 (see FIG. 2), one located in the transmit signal path for summing and amplifying the carrier signals transmitted from the central office circuits COT1–COT8, and the other located in the receive signal path for amplifying the composite of subscriber-transmitted carrier signals that are sent up line 32 from the subscriber terminal circuits STU1–STU8 for application to the receivers in the central office terminal circuits COT1–COT8.

The transmitters and receivers in each of the subscriber terminal circuits STU1–STU8 are connected to line 32 remotely from central office 33 by way of a line driver and receive amplifier unit 38. Similar to unit 34, unit 38 is a four-wire circuit providing separate transmit and receive signal paths, the latter for feeding the central office-transmitted carrier signals from transmission line 32 to the receivers in the subscriber terminal circuits STU1–STU8, and the former for feeding the carrier signals from the transmitters in the subscriber circuits STU1–STU8 to transmission line 32. Like unit 34, unit 38 also advantageously includes a pair of amplifiers 39 and 40 (see FIG. 2), one located in the transmit signal path of unit 38 for summing and amplifying the carrier signals that are transmitted from the subscriber terminal circuits STU1–STU8 and the other located in the receive signal path of unit 38 for amplifying the composite of incoming carrier signals from the central office.

The subscriber terminal circuits STU1–STU8 are connected to separate subscriber telephones 42 by suitable means such as subscriber drops 44. The locations of telephones 42 are immaterial so far as this invention is concerned.

As is customary in telephone carrier systems, each of the central office terminal circuits COT1–COT8 transmits at a pre-selected carrier frequency that is different from the transmission carrier frequencies allocated to the remaining central office terminal circuits and also different from the carrier frequencies that are transmitted up the transmission line 32 in the opposite direction from the subscriber terminal circuits STU1–STU8. Likewise, the subscriber terminal circuits STU1–STU8 transmit at pre-selected carrier frequencies that are different from each other and different from the transmit frequencies assigned to the central office terminal circuits COT1–COT8. The allocation of different carrier frequencies for the carriers on transmission line 32 is referred to and designated as frequency division multiplexing.

At the central office, the receivers and transmitters in the central office terminal circuits COT1–COT8 are connected by central office drops 46 to appropriate terminals in the central office exchange equipment which is indicated at 48 in FIG. 1A.

Sub-systems 22–26 are advantageously the same as sub-system 21. Accordingly, like reference numerals have been applied to designate the corresponding parts of sub-systems 22–26 and have been suffixed by different letters, namely the letter $a$ for sub-system 22 the letter $b$ for sub-system 23, the letter $c$ for sub-system 24, the letter $d$ for sub-system 25, and the letter $e$ for sub-system 26.

As shown in FIG. 1A, all of the central office terminal circuits of sub-systems 21–26 (namely COT1–COT8, COT1$a$–COT8$a$, COT1$b$–COT8$b$, COT1$c$–COT8$c$, COT1$d$–COT8$d$, and COT1$e$–COT8$e$) together with the line driver and receive amplifier units 34 and 34$a$–34$e$ are advantageously grouped together in a single central office terminal unit 50. Similarly, all of the subscriber terminal circuits of carrier sub-systems 21–26 (namely STU1–STU8, STU1$a$–STU8$a$, STU1$b$–STU8$b$, STU1$c$–STU8$c$, STU1$d$–STU8$d$ and STU1$a$–STU8$e$) together with the line driver and receive amplifier units 38 and 38$a$–38$e$ are all grouped together in a single subscriber terminal unit 52 at the ends of the carrier system transmission lines remote from central office 33. The coextensively extending transmission lines 32 and 32$a$–32$e$ of carrier sub-systems 21–26 may advantageously be grouped together in a common cable indicated at 55 in FIGS. 1A and 1B. The lengths of transmission lines 32 and 32$a$–32$e$ between terminals 50 and 52 are made equal.

Since sub-systems 21–26 are alike, only sub-system 21 will be described in greater detail.

In sub-system 21, the central office terminal circuits COT1–COT8 are alike. Also, the subscriber terminal circuits STU1–STU8 are alike. Accordingly, only three of the central office and three subscriber terminal circuits are shown in FIG. 2 for the purpose of illustration.

Figure 3:
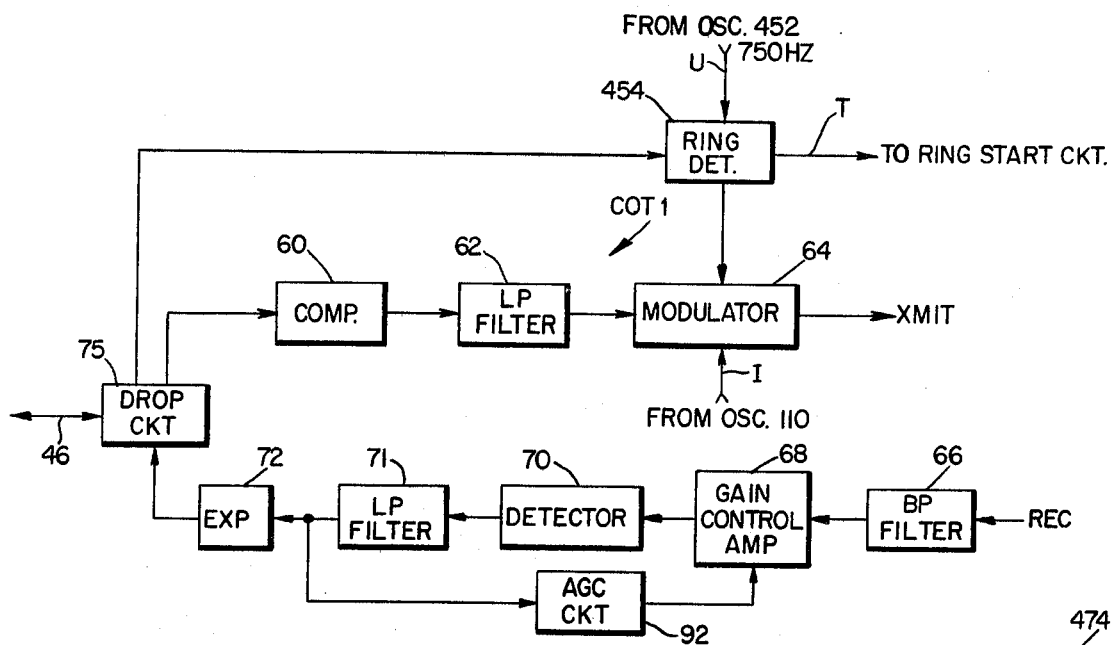
FIG. 3 is a schematic block diagram of one of the central office transmitting and receiving terminal circuits shown in FIG. 2.
Figure 4:
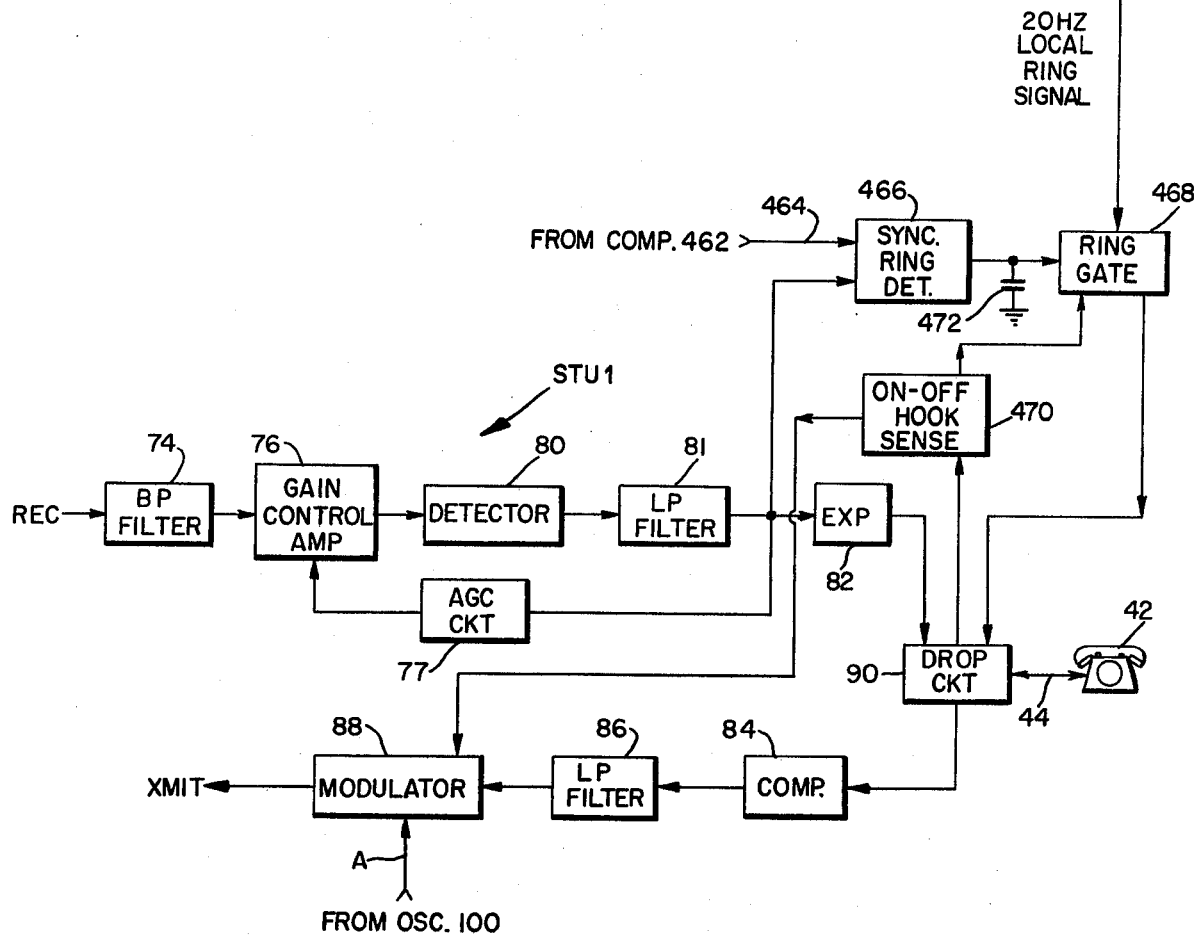
FIG. 4 is a schematic block diagram of one of the subscriber transmitting and receiving terminal circuits shown in FIG. 2.

Referring to FIG. 3, the transmitter in each of the central office terminal circuits COT1–COT8 is shown to comprise a compressor 60, a low pass filter 62, and a modulator 64. The receiver in each of the central office terminal circuits is shown to comprise a bandpass filter 66, a gain controlled amplifier 68, a detector or demodulator 70, a low pass filter 71 and an expandor 72. The receiver in each of the subscriber terminal circuits STU1–STU8 as shown in FIG. 4, similarly comprises a bandpass filter 74, a gain controlled amplifier 76, a detector or demodulator 80, a low pass filter 81, and an expandor 82. The transmitter in each of the subscriber terminal circuits comprises a compressor 84, a low pass filter 86, and a modulator 88.

Voice frequency intelligence to be transmitted by way of a selected channel (say channel 1, for example) from the central office exchange equipment 48 to the subscriber's telephone 42 served by that channel, is fed by way of drop 46 and a drop circuit 75 to compressor 60. Compressor 60 compresses the dynamic range of the voice signals in the usual manner.

From compressor 60 the compressed voice frequency signals are fed through filter 62 to modulator 64 where they modulate a carrier frequency signal from an oscillator source to provide a double sideband amplitude modulated carrier signal. The circuit of filter 62 may be of any suitable design for rejecting frequencies above approximately 3000Hz. Filter 62 therefore passes only voice frequency information and serves to keep the carrier and other high frequencies out of compressor 60.

The carrier signal supplied at the output of modulator 64 is fed by way of unit 34 to transmission line 32 for transmission down the line to the subscriber terminal equipment. From line 32 the amplitude modulated carrier signal is fed by way of unit 38 to the input terminals of the receivers 58 in the subscriber terminal circuits STU1–STU8.

The upper and lower cutoffs of the bandpass filters in the subscriber terminal circuits STU1–STU8 are selected so that each filter is tuned to and hence passes only the transmitted carrier frequency (together with its sidebands) that is allocated to its associated central office terminal circuit. Thus, for this example, the filter 74 in subscriber terminal circuit STU1 will pass only the carrier frequency and its associated sidebands that are transmitted by the central office terminal circuit COT1, the bandpass filter in subscriber terminal circuit STU2 will pass only the carrier frequency and its associated sidebands that are transmitted by the central office terminal circuit COT2, and so on. Filter 74 therefore determines the receiver's selectivity and passes only one carrier frequency signal together with its sidebands to the input of the amplifier 76. The gain of amplifier 76 is controlled by closed loop automatic gain control, which is generally indicated at 77 in FIG. 4, to stabilize the level of the received carrier signal regardless of variations in the amplitude of the carrier at the input of amplifier 76.

Following amplification by amplifier 76, the carrier signal is fed to detector 80. Detector 80 detects the received carrier signal to recover the voice frequency intelligence which was modulated onto the carrier at the associated central office terminal circuit. Filter 81 has an upper cutoff of about 3000Hz to pass the detected VF signal and reject components of frequencies higher than 3000Hz.

From filter 81, the recovered and filtered voice frequency signal is fed to expandor 82 which restores the voice frequency signal to its original dynamic range. From expandor 82, the voice frequency signal is coupled to the receiver in telephone 42 by way of a drop circuit 90 and drop 44.

Voice frequency intelligence originating from the subscriber's telephone 42 is fed by way of hybrid 90 to compressor 84 which performs the same function as compressor 60. From compressor 84, the compressed voice frequency signals are fed through filter 86 to modulator 88 where they modulate a carrier signal from an oscillator source to develop a double sideband amplitude modulated carrier signal. The purpose of filter 86 is the same as that previously described for filter 62. The carrier signal transmitted from modulator 88 is fed by way of unit 38 to transmission line 32 for transmission up the line to the central office terminal circuits COT1–COT8.

Similar to the bandpass filters 74 in the subscriber terminal circuits, the upper and lower cutoffs of the bandpass filters 66 in the central office terminal circuits COT1–COT8 are selected so that each filter is tuned to and hence passes only the transmit carrier frequency and associated sidebands allocated to its associated subscriber terminal circuit. Thus, for this example, filter 66 in the central office terminal circuit COT1 will pass only the carrier frequency and associated sidebands transmitted by the subscriber terminal circuit STU1, the bandpass filter in central office terminal circuit COT2 will pass only the carrier frequency and associated sidebands transmitted by the subscriber terminal circuit STU2, and so on.

From filter 66 the received carrier signal together with its sidebands are fed to amplifier 68. The gain of amplifier 68 is controlled by closed loop automatic gain control, which is indicated at 92 in FIG. 3, to stabilize the level of the received carrier signal.

Following amplification, the carrier signal is fed to the detector 70. Detector 70 detects the received signal to recover the transmitted VF modulation in the same manner described for detector 80. From detector 70 the voice frequency and carrier components are fed to filter 71. Filter 71 is the same as filter 81 and has an upper cutoff of about 3000Hz to pass only the recovered voice frequency signals, while rejecting components of frequencies higher than 3000Hz.

From filter 71 the recovered and filtered voice frequency signals are fed to expandor 72 which restores the voice frequency signals to their original dynamic range. From expandor 72, the voice frequency signals are coupled to the central office exchange equipment 48 by way of drop circuit 74 and drop 46.

Instead of employing a separate carrier frequency oscillator for each transmitter in the several subscriber terminal circuits of sub-systems 21–26, the number of oscillators employed in this invention are reduced to correspond to the number of subscriber terminal circuits in just one carrier system. Thus for the illustrated embodiment, only eight transmit carrier frequency oscillators are employed as indicated at 100, 101, 102, 103, 104, 105, 106 and 107 in FIG. 1B. This significant cost-reducing feature is conveniently accomplished by grouping all 48 of the subscriber terminal circuits STU1–STU8, STU1a–STU8a, STU1b–STU8b, STU1c–STU8c, STU1d–STU8d and STU1e–STU8e in the single group terminal 52 as previously described and further by employing a carrier frequency allocation scheme in which the carrier frequencies for all six of the sub-systems 21–26 are the same. Thus for this carrier frequency allocation scheme, the same carrier frequency is employed for channel 1 of all six of the sub-systems 21–26, the same carrier frequency is employed for channel 2 of all six of the sub-systems, and so on. One example of a suitable carrier frequency allocation scheme is designated in FIG. 1B of the drawings.

As shown, oscillator 100 feeds its carrier frequency waveform to the modulators 88 in subscriber terminal circuits STU1 and STU1a–STU1e by way of signal lines indicated at A. Similarly, oscillator 101 feeds its carrier frequency waveform to the transmit modulators 88 in subscriber terminal circuits STU2 and STU2a–STU2e by way of signals lines B. In a similar fashion, oscillator 102 feeds its carrier frequency waveform to the transmit modulators 88 in subscriber terminal circuits STU3 and STU3a–STU3e by way of signal lines C. Oscillator 103 feeds its carrier frequency waveform to the transmit modulators 88 in subscriber terminal circuits STU4 and STU4a–STU4e by way of signal lines D. Oscillator 104 feeds its carrier frequency waveform to the transmit modulators in subscriber terminal circuits STU5 and STU5a–STU5e by way of signal lines E. Oscillator 105 feeds its carrier frequency waveform to the transmit modulators in subscriber terminal circuits STU6 and STU6a-STU6e by way of signal lines F. Oscillator 106 feeds its carrier frequency waveform to the transmit modulators 88 in subscriber terminal circuits STU7 and STU7a-STU7e by way of signal lines G, and oscillator 107 feeds its carrier signal waveform to the transmit modulators 88 in subscriber terminal circuits STU8 and STU8a-STU8e by way of signal lines H.

As shown in FIG. 1B, all of the transmit carrier frequency oscillators 100-107 are advantageously located in the subscriber group terminal 52 and may be assembled on one or more circuit cards outboard of the circuit cards mounting the subscriber terminal circuits of carrier systems 21-26.

An eight-oscillator arrangement similar to that just described for the subscriber terminal 52 may be employed in the central office terminal 50 to further reduce costs of the communication system of this invention. Thus, in this embodiment, there are only eight oscillators for furnishing the transmit carrier frequencies for all forty-eight of the central office terminal circuits in the sub-systems 21-26. These oscillators are indicated at 110, 111, 112, 113, 114, 115, 116 and 117 in FIG. 1A.

As shown, oscillator 110 feeds its carrier frequency waveform to the transmit modulators 64 in central office terminal circuits COT1 and COT1a-COT1e by way of signal lines indicated at I. Similarly, oscillator 111 feeds its carrier signal waveform to the transmit modulators 88 in the central office terminal circuits COT2 and COT2a-COT2e by way of signal lines J. In a similar fashion, oscillator 112 feeds its carrier frequency waveform to the transmit modulators in the central office terminal circuits COT3 and COT3a–COT3e by way of signal lines K. Oscillator 113 feeds its carrier frequency waveform to the transmit modulators in central office terminal circuits COT4 and COT4a–COT4e by way of signal lines L. Oscillator 114 feeds its carrier frequency waveform to the transmit modulators in central office terminal circuits COT5 and COT5a–COT5e by way of signal lines M. Oscillator 115 feeds its carrier frequency waveform to the transmit modulators in central office terminal circuits COT6 and COT6a–COT6e by way of signal lines N. Oscillator 116 feeds its carrier frequency waveform to the transmit modulators in the central office terminal circuits COT7 and COT7a-COT7e by way of signal lines P, and oscillator 117 feeds its carrier frequency waveform to the transmit modulators in central office terminal circuits COT8 and COT8a-COT8e by way of signal lines R.

Oscillators 110-117 may advantageously be assembled on one or more circuits cards outboard of the circuit cards mounting the central office terminal circuits of sub-systems 21-26 as shown.

The circuit designs of oscillators 100-107 are advantageously alike except for differences in certain components values that set the different oscillation frequencies of the oscillators. Likewise, the circuit designs of oscillators 110-117 may also be alike except for the differences of certain component values that set the different oscillator operating frequencies.

In the illustrated carrier frequency allocation scheme for each sub-system, the carrier frequencies transmitted from the central office transmitting and receiving terminal circuits in terminal unit 50 are contained in a frequency band that is higher than and does not overlap with the carrier frequencies that are transmitted from the subscriber transmitting and receiving terminal circuits in terminal unit 52. High and low pass directional filters 119 and 121 (see FIG. 2) are employed in unit 38 to provide isolation for this carrier frequency allocation scheme. Filter 119 is in the receive signal path in series with amplifier 39 and passes the high group of central office transmitted carrier frequencies (88kHz-144kHz) while rejecting the low group of subscriber-transmitted carrier frequencies (8kHz-64kHz). Filter 121 is in the transmit signal path in series with amplifier 40 and passes the low group of subscriber-transmitted carrier frequencies, while rejecting the high group of central office-transmitted carrier frequencies. Since units 38 and 38a-38e are alike, like reference numerals suffixed by the appropriate letters a-e have been applied to designate corresponding parts of units 34a-34e. Thus, in FIG. 5, the high pass filters in units 38a-38e are respectively indicated at 119a, 119b, 119c, 119d and 119e.

Each of units 34 and 34a-34e is similarly equipped with high and low pass directional filters 123 and 125 (see FIG. 2) which are in series with amplifiers 35 and 36 respectively. Filters 123 and 125 perform the same functions as filters 119 and 121.

In accordance with an important feature of this invention, the carrier communication system or facility 20 includes a novel automatic carrier level coordination control system or circuit 127 (see FIG. 1B) which is common to all of the carrier sub-systems 21-26 in the carrier communication facility 20. Automatic carrier level coordination control is advantageously employed to reduce crosstalk or interference in an installation where the transmission lines of different carrier facilities are in close proximity to each other and, rather than being restricted to the same or given length, may be and usually are of different lengths. For example, a carrier installation, generally at 128 in FIG. 8A, may include the communication facility 20 and at least one additional communication facility 20' which may be the same design as the communication facility 20. Like reference characters are applied to designate corresponding parts of facilities 20 and 20' except that the reference characters for facility 20' have been primed to distinguish them from the reference characters that are used for identifying the parts of facility 20.

Figure 8:
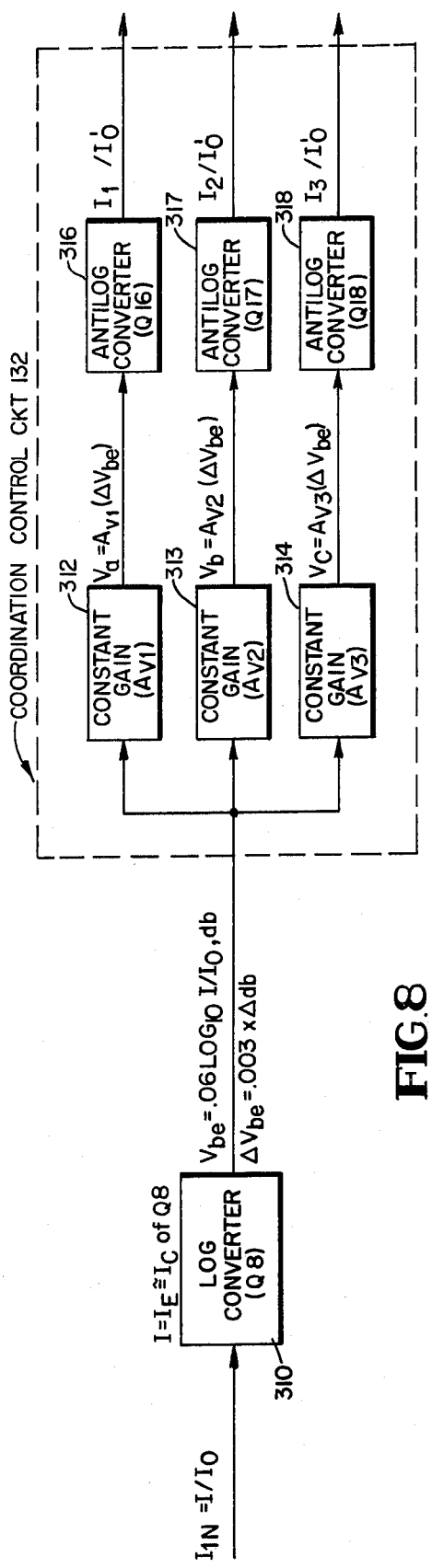
FIG. 8 is a schematic box diagram of the log-antilog converter that is defined by the automatic coordination control circuit and circuitry in the pilot carrier receiver.
Figure 8A:
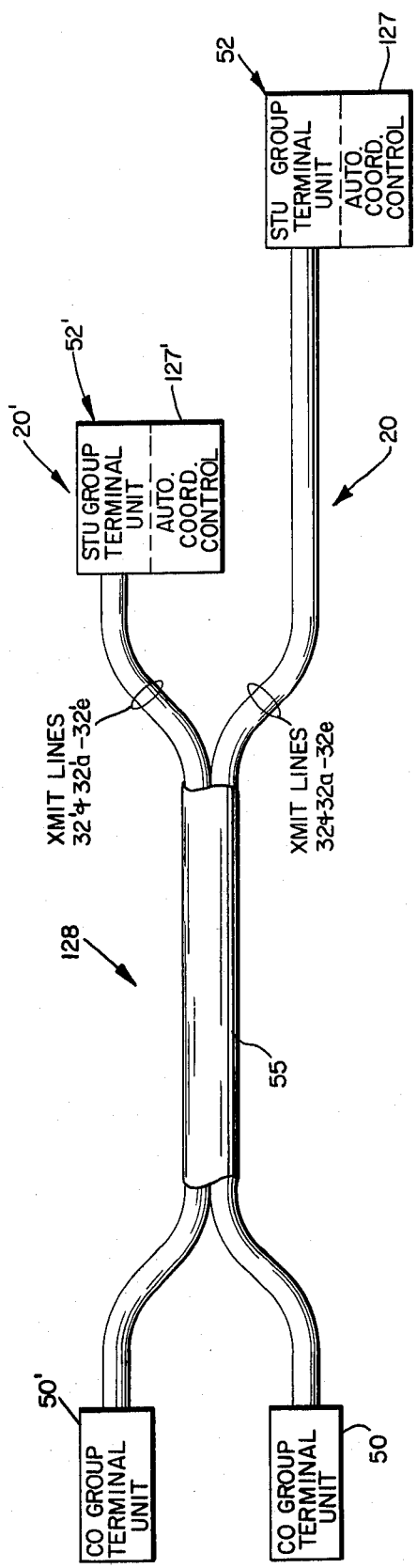
FIG. 8A is a schematic block diagram of an installation having a pair of the carrier communication facilities shown in FIGS. 1A and 1B.

In the example shown in FIG. 8A, the transmission lines 32, 32a-32e, 32' and 32a'-32e' of the two carrier communication facilities have coextensive portions in the same cable 55 and are connected to separate terminals (50 and 50') at the same central office or exchange. Such a transmission installation gives rise to crosstalk or mutual interference between the communication facilities and/or carrier sub-systems making up the facilities unless the subscriber transmit carrier levels are properly coordinated. The crosstalk problem does not arise with the central office transmitted carrier signals because all of the central office carrier signals of common frequency are transmitted at the same level.

The crosstalk or interference problem is minimized by coordinating the subscriber carrier levels in such a way that, regardless of any differences between lengths of transmission lines making up the overall installation, the power of carrier signals of like or corresponding frequencies on the different transmission lines in the overall installation will be at least approximately the same at any point along the complete cable or the coextensive portions of the transmission lines.

The expression "automatic carrier level coordination control" is therefore understood to mean that at any point along coextensive portions of two or more separate transmission paths or transmission lines for different carrier systems in a common installation, the powers of the carrier signals of common or like frequency will automatically be made at least approximately equal at any point along cable 55, regardless of any differences in the lengths of the transmission lines in the installation and for any transmission line length within the operating range of the automatic coordination control system or circuitry.

In order to coordinate the carrier levels regardless of the differences or variations in transmission line lengths the coordination control system (127 and 127') in each installation is effective to automatically adjust the transmit level (i.e., the carrier power) of each subscriber carrier signal in accordance with the attenuation that the carrier will undergo at its transmit frequency upon transmission over its transmission line. Every signal frequency, carrier or otherwise, will have a different attenuation for a given transmission line length. Adjustment of each carrier signal level as a function of attenuation at its transmit frequency is therefore a necessary factor for achieving automatic coordination control.

As shown in FIG. 1B, the automatic coordination control system 127 comprises a pilot frequency communication receiver circuit 131 and a coordination control circuit 132. Circuits 131 and 132, as well as a pilot signal search and lock circuit 133 (to be described later), are common to all six of the sub-systems 21–26 and are located at the subscriber terminal 52.

In general, receiver 131 is tuned to receive a central office-transmitted carrier frequency pilot signal and develops a control voltage that is indicative of the deviation of the received pilot signal level from a pre-selected or nominal, pre-set reference. This control voltage therefore varies as a function of the transmission line length between terminals 50 and 52 at a pre-selected pilot signal frequency. As such, the control voltage provides a measure of the common length of transmission lines 32 and 32a–32e which, as previously mentioned, may and usually does vary for different installations.

The control voltage developed by receiver circuit 131 is applied to the automatic coordination control circuit 132, and from this single control voltage, circuit 132 derives a number of different coordination control voltages for individually controlling the amplitudes of the carrier frequency signal voltages generated by oscillators 100–107. The control of the oscillator voltages or power, in turn, determines and adjusts the levels (i.e., the carrier transmit power) of the carrier signals that are transmitted from the subscriber terminal circuits (STU-1–STU8, etc.) in terminal unit 52. In this manner, each subscriber transmit carrier level will be adjusted by one of the coordination voltages in accordance with the attenuation that it undergoes at its transmit frequency upon transmission over its assigned transmission line.

By equipping terminal unit 52' with a corresponding coordination control system 127', then all of the subscriber transmit carrier levels of the same frequency will be at least approximately the same level at any point along the coextensive portions of transmission lines 32, 32a–32e, 32' and 32a'–32e' in cable 55, regardless of any difference between the group of transmission lines 32 and 32a–32e and the group of transmission lines 32' and 32a'–32e' and regardless of the length of each individual transmission line group within the operating range of the coordination control systems 127 and 127'. It will be noted that both systems 127 and 127' operate against equal references to provide proper level coordination.

With automatic coordination control all of the subscriber transmit carrier signals will arrive back at the central office and/or some other terminating point at pre-selected levels which remain the same regardless of variations in transmission line lengths and which may or may not be the same depending upon the choice of the design for the overall system. In the particular embodiment illustrated herein, the coordination control systems 127 and 127' are designed in such a manner that they cause all of the subscriber-transmitted carriers to arrive back at the central office or repeaters at a common location at least at approximately the same level.

Rather than dedicating a separate transmission line or conductor pair in the cable for transmitting the line-measuring pilot signal from the central office to receiver 131, it is preferred to transmit the pilot signal by one of the carrier signal transmission lines 32 and 32a–32e itself in order to reduce costs. Such a transmission scheme, however, has a number of significant drawbacks. First, the carrier system transmission line used to transmit the pilot signal cannot be taken out of operation, thus limiting the leeway in selecting the carrier sub-system to be put in operation where it is desired to operate fewer than all six of the carrier sub-systems in the transmission facility. Furthermore, the pilot signal received at receiver 131 may be weakened beyond its normal attenuation because of damage to or a defect in the particular transmission line selected to transmit the pilot signal to receiver 131. The weakened pilot will result in miscoordination of carrier signal levels to promote crosstalk or interference. These drawbacks, among others, are avoided by transmitting pilot signals of common carrier frequency over all six of the transmission lines 32 and 32a–32e and by utilizing the search and lock circuit 133 to select a relatively strong pilot signal for use in the carrier level coordination control operation. In this example, therefore, a carrier frequency pilot signal is transmitted with each group of eight channels.

As shown in FIG. 1A, the pilot signals transmitted down lines 32 and 32a–32e to search and lock circuit 133 originate from a single oscillator 134. Oscillator 134 is located in the central office terminal unit 50 and feeds its pilot signal waveform of pre-selected frequency by way of signal lines S to the transmit paths in the line driver units 34 and 34a–34e. From there the injected pilot signals are applied to lines 32 and 32a–32e for transmission circuit 133. The carrier signals that are modulated by voice frequency message intelligence at the transmitters of the central office and subscriber terminal circuits in carrier systems 21–26 may be referred to as information or voice channel carrier signals to distinguish them from the pilot signal that is generated by oscillator 134.

The oscillation frequency of oscillator 134 and hence the pilot signal frequency may be selected at any suitable value above 6000 Hz. In the illustrated embodiment the frequency of the operating frequency of oscillator 134 is selected to be 152kHz which is 8kHz above the highest information channel carrier frequency transmitted from group terminal 52.

Circuit 133, as will be described in detail presently, progressively searches a plurality of different signal level thresholds to select and lock with one of the transmitted carrier frequency pilot signals that is above the highest possible signal level threshold. To accomplish this, circuit 133 is shown in FIG. 5 to comprise a six input-single output electronic selector or stepping switch 140 and a comparator 142.

Figure 5:
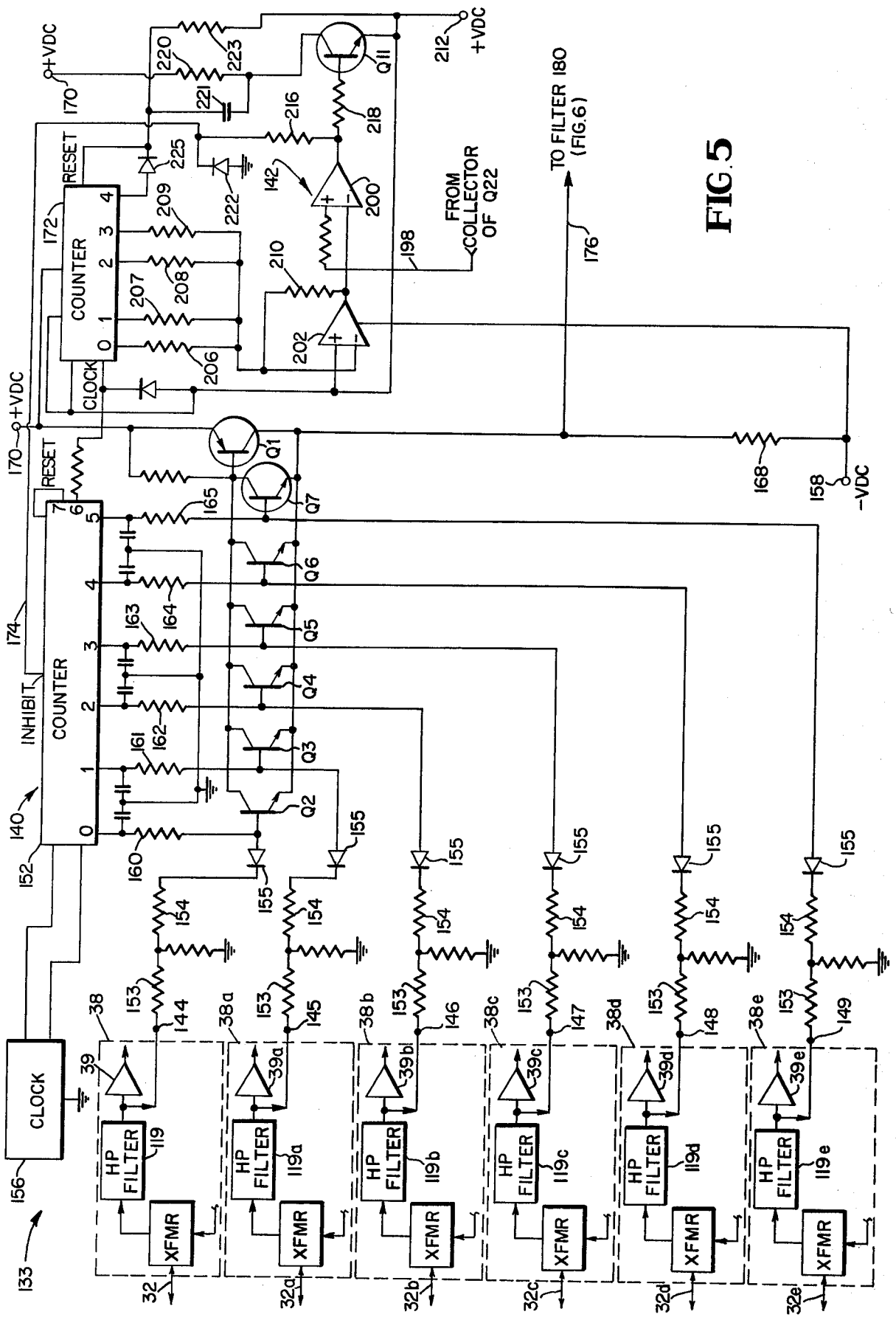
FIG. 5 is a schematic circuit diagram of the search and lock circuit shown in FIG. 1B.

In FIG. 5, the six inputs of switch 140 are indicated at 144, 145, 146, 147, 148 and 149. The single output of switch 140 is taken from the collector of an NPN transistor Q1. The driver and receive amplifier units 38 and 38a–38e are respectively connected to the switch terminals 144, 145, 146, 147, 148 and 149.

With these circuit connections it will be appreciated that all of the central office-transmitted information channel carrier signals and the frequency pilot signal on transmission line 32 are fed to terminal 144, that all of the central office-transmitted information channel carrier signals and the carrier frequency pilot signal on transmission line 32a are fed to terminal 145, that all of the central office-transmitted information channel carrier signals and the carrier frequency pilot signal on line 32b are fed to terminal 146, that all of the central office-transmitted information channel carrier signals and the carrier frequency pilot signal on line 32c are fed to terminal 147, that all of the central office-transmitted information channel carrier signals and the carrier frequency pilot signal on line 32d are fed to terminal 148, and that all of the central office-transmitted information channel carrier signals and the carrier frequency pilot signal on transmission line 32e are fed to terminal 149.

When circuit 130 is in its search mode, switch 140 sequentially and recurrently scans terminal 144–149. The composite of the information channel and pilot signals on each input terminal at the time of scanning, is fed by means to be described shortly to the switch's output terminal at the collector of transistor Q1. To accomplish this, switch 140 may be of any suitable circuit design and is shown in the preferred embodiment to comprise a divide-by-eight decimal counter 152 and six NPN switching transistors Q2, Q3, Q4, Q5, Q6 and Q7.

Terminals 144–149 are connected by way of separate signal paths to the bases of switching transistors Q2, Q3, Q4, Q5, Q6 and Q7 respectively. Each of these signal paths comprises a resistive voltage divider 153, a base resistor 154 and rectifying diode 155. In each signal path feeding the bases of transistors Q2–Q7, the diode 155 merely provides isolation when its associated switching transistor is turned off. Each diode 155 will conduct when its associated switching transistor is turned on.

Counter 152 is triggered by pulses from a clock 156. The parallel outputs of counter 152 are indicated at 0, 1, 2, 3, 4, 5, 6 and 7 in FIG. 5.

In the illustrated embodiment, d.c. base biasing for transistors Q2–Q7 are furnished by equal value resistors 160, 161, 162, 163, 164 and 165 respectively.

As shown, resistors 160–165 are connected at corresponding ends to the counter output terminals 0, 1, 2, 3, 4 and 5 respectively. The other terminals of resistors 160–165 connected to the bases of transistors Q2–Q7, respectively to thus feed transistors Q2–Q7 from output terminals 0–5, respectively.

The emitters of transistors Q2–Q7 are connected by way of a common emitter resistor 168 to the negative terminal of voltage source 158 as shown. The collector of transistor Q1 is also connected to the negative terminal of voltage source 158 by way of resistor 168 which acts as the load for transistor Q1. The emitter of transistor Q1 is connected to the positive terminal of a suitable voltage source indicated at 170.

The collector of transistor Q1 is directly d.c. coupled to the emitters of transistors Q2–Q7, and the base of transistor Q1 is directly d.c. coupled to the collectors of transistors Q2–Q7 so that transistor Q1 forms a darlington with any one of the transistors Q2–Q7 which is switched to its conductive state.

For any given number of clock pulses counted in by counter 152, only one of the counter's output terminals will be high at some positive, suitable voltage value while the remaining output terminals will be low at ground potential. When the counter 152 is reset or cleared, the voltage on its 0 output terminal will go high to switch on transistor Q2, while the remaining output terminals of counter 152 remain low at ground potential to maintain transistors Q3–Q7 in their non-conductive states. When the first pulse is counted in by counter 152 after reset the voltage on the counter's 0 output terminal goes low, the 1 output terminal goes high and the remaining output terminals of counter 152 remain low. When this happens, transistor Q2 will be switched off, transistor Q3 will be switched on and transistors Q4–Q7 will remain in their non-conductive states.

When the second clock pulse is counted in by counter 152 after reset the voltage on the 1 output terminal goes low, the voltage on the 2 output terminal goes high and the remaining terminals of counter 152 remain at ground potential. Under these counter output voltage conditions, transistor Q3 will be switched off, transistor Q4 will be switched on and transistors Q2 and Q5–Q7 will remain in their non-conductive states. When the third clock pulse is counted in by counter 152 after reset, the voltage on the 2 output terminal will go low and the voltage on the 3 output terminal will go high, while the voltages on the remaining output counter terminals remain at ground potential. Thus, transistor Q4 will be switched off, transistor Q5 will be switched on and transistors Q2, Q3, Q6 and Q7 will remain in their non-conductive states.

When the fourth clock pulse is counted in by counter 152 after reset, the voltage on the counter's output terminal goes low, the voltage on the counter's 4 output terminal goes high and the voltage on the counter's remaining output terminals remain at ground potential. At this time, therefore, transistor Q5 will be switched off, transistor Q6 will be switched on and transistors Q2–Q4 and Q7 will remain in their non-conductive states.

When the fifth clock pulse is counted in after reset, the voltage on the counter's 4 output terminal goes low, the voltage on the 5 output terminal goes high and the voltages on the counter's remaining output terminals remain at ground potential. Under this condition, transistor Q6 will turn off, transistor Q7 will turn on, and transistors Q2–Q5 will remain in their non-conductive states.

When transistor Q2 is switched on, the composite of the information channel carrier and pilot signals at terminal 144 is fed to the selector switch output terminal at the collector of transistor Q1. When transistor Q3 is switched to its conductive state the composite of the channel carrier and pilot signals at terminals 145 is fed to the selector switch's output terminal at the collector of transistor Q1. When transistor Q4 is switched to its conductive state, the composite of the channel carrier and pilot signals at terminal 146 is fed to the selector switch's output terminal at the collector of transistor Q1. When transistor Q5 is switched to its on state, the composite of the channel carrier and pilot signals at terminal 147 is fed to the selector switch output terminal at the collector of transistor Q1. When transistor Q6 is switched to its conductive state, the composite of the channel carrier and pilot signals at terminal 148 is fed to the selector switch's output terminal at the collector of transistor Q1, and when transistor Q7 is switched to its on state, the composite of the channel carrier and pilot signals at terminal 149 is fed to the selector switch's output terminal at the collector transistor Q1.

From the foregoing it will be appreciated that during the search cycle of circuit 133, the different composite signals at the selector switch input terminals 144–149 are successively fed to the collector of transistor Q1 by operation of selector switch 140.

Upon counting in the sixth clock pulse, the voltage on the 6 output terminal of the counter goes high and the voltages on the remaining output terminals of the counter will be low. Thus, upon counting the sixth clock pulse, transistors Q2–Q7 will be switched to their non-conductive states. The voltage pulse on the 6 output terminal of counter 152 is applied to trigger a further counter 172 in comparator 142 for the purpose to be described in detail later on.

In this embodiment, the 7 output terminal of counter 152 is connected to the counter's reset terminal. Thus, upon counting in the seventh clock pulse, counter 152 is automatically reset or cleared to make its 0 output high. Counter 152 therefore automatically recycles to once again successively feed the composite signals on input terminals 144–149 to the selector switch output terminal at the collector of transistor Q1. Counter 152 will continue to recycle in this manner until a counter inhibit signal is applied on a signal line 174.

Figure 6:
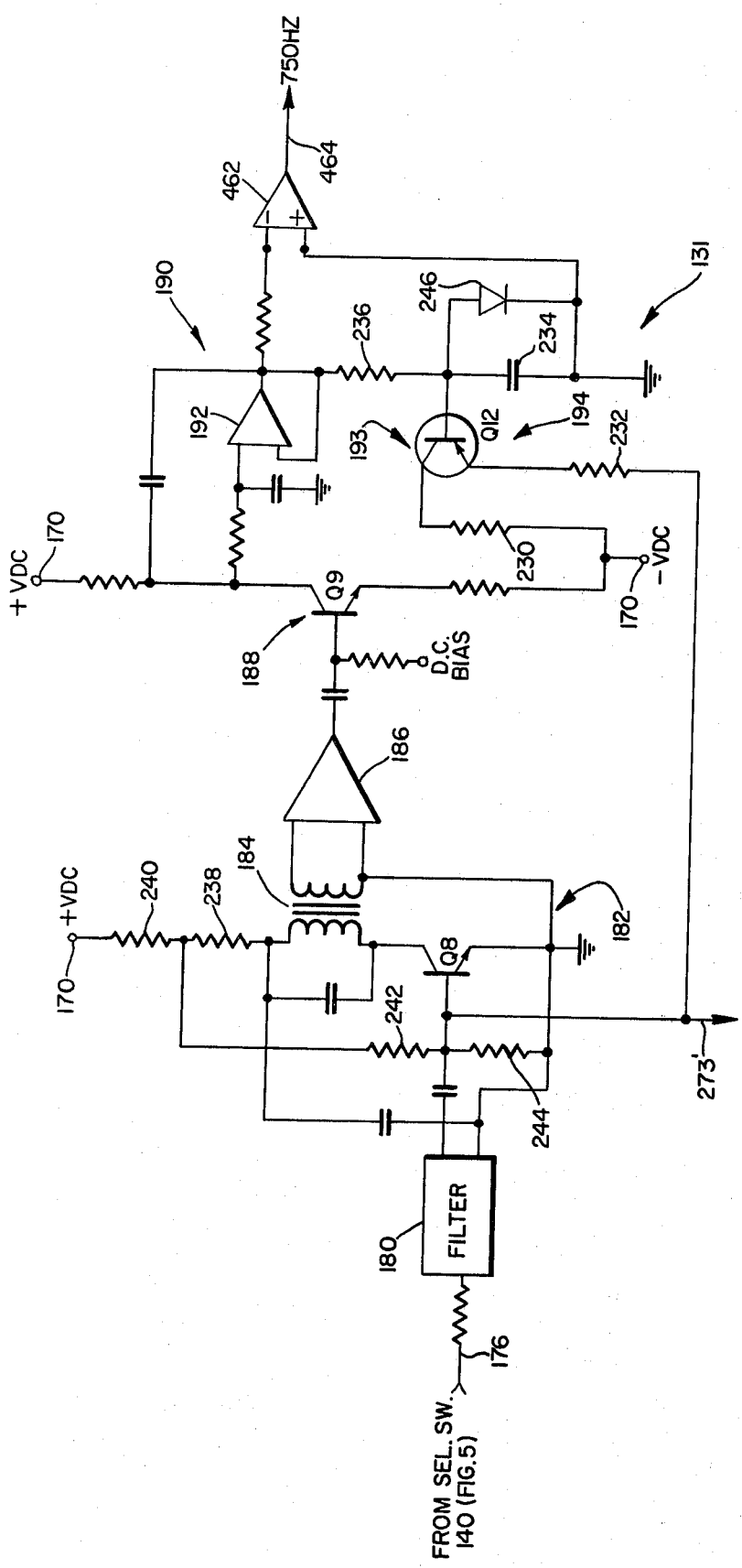
FIG. 6 is a schematic circuit diagram of the pilot carrier receiver shown in FIG. 1B.

Each composite signal applied to the collector of transistor Q1 by selector switch 140 is fed by way of a signal line 176 to receiver 131. As shown in FIG. 6, receiver 131 has a front-end filter 180. Filter 180 may be of the bandpass or high pass type, having a cutoff that is selected to pass only the pilot signal (which is 152kHz in the illustrated example of the carrier frequency allocations) while rejecting passage of other frequency components, including the information channel carrier signals. The filtered carrier frequency pilot signal is capacitively coupled from the output of filter 180 to the base of an NPN transistor Q8 in a variable gain, single transistor amplifier circuit 182 in receiver 131.

The amplified pilot signal at the output of amplifier circuit 182 is taken from the collector of transistor Q8 and is coupled by a transformer 184 to the input of a fixed gain amplifier 186. The received pilot signal is further amplified by amplifier 186 and is then capacitively coupled to the input of a detector 188 in receiver 131. Amplifier 186 has a high input impedance and low output impedance. The purpose of amplifier 186 is to permit voltage swing on the collector of transistor Q8 to remain small, thus increasing the possible AGC range of receiver 131.

Detector 188 may be on any suitable circuit design and is shown in this example to comprise a single transistor Q9. The amplified pilot signal at the output of amplifier 186 is fed to the base of transistor Q9. The output of detector 188 is taken from the collector of transistor Q9 and is fed to an active low pass filter 190 having an operational amplifier 192 with feedback. It will be appreciated that any suitable filter and amplifier circuitry may be employed in place of the active filter 190.

Detector 188 detects the received pilot signal and the detected pilot signal waveform is then filtered by filter 190 to present the average of the detected pilot signal at the output of amplifier 192. The output of amplifier 192 is fed to an AGC reference amplifier 193 in a gain control circuit 194 for receiver 131.

As will be described in greater detail later on, the amplifier 193 automatically controls the gain of amplifier 182 in such a way that the base emitter voltage on transistor Q8 varies inversely with respect to the received pilot signal level. This base voltage of transistor Q8 is applied as the input or control voltage for the coordination control circuit 132. From this single input voltage circuit 132 develops all of the previously mentioned coordination control voltages that control the signal voltage amplitudes of oscillators 100–107. Accordingly, all of the coordination control voltages will be varied as a function of the base voltage on transistor Q8 and hence as a function of the received pilot signal level.

In this embodiment, one of the coordination control voltages mentioned above is fed back from the coordination control circuit 132 to the comparator 142 in the search and lock circuit 133 for the purpose of automatically selecting one of the six transmitted pilot signals to be used for achieving automatic coordination control.

During the search cycle of the search and lock circuit 133, the pilot signals on transmission lines 32 and 32a–32e will successively be received and detected by the pilot frequency receiver 131. The variable voltage on the base of transistor Q8 will therefore vary with each of the received pilot signals. As a result, the coordination control voltage, which is developed by the coordination circuit 132 and which is selected for feedback to comparator 142, will vary as a function of the level of each pilot signal as it is received by receiver 131.

In this embodiment, the coordination control voltage used to control the level of oscillators 106 and 107 is selected for feedback to comparator 142. This feedback control voltage is applied by way of a signal line 198 to the positive input terminal of an operational amplifier 200 in comparator 142 as shown in FIG. 5.

In addition to amplifier 200 and counter 172, comparator 142 includes another operational amplifier 202 which feeds an adjustable d.c. reference voltage to the negative input terminal of amplifier 200. Amplifier 200 compares the coordination control voltage on line 198 with the d.c. reference voltage from amplifier 202.

As shown in FIG. 5, counter 172 may be of the same type as counter 152. Depending upon the number of clock pulses counted in by counter 172, each of the counter's output terminals will either be a logical high at some pre-selected suitable voltage value, such as +8 volts, or a logical low as some lower voltage value which is selected in this particular embodiment to be +4 volts.

Upon resetting or clearing counter 172, the voltage on the counter's 0 output terminal will go high and the voltages on the remaining output terminals will be at the low voltage value of +4 volts. As pulses are clocked in by counter 172 to advance the count in the counter, the high voltage value shifts successively to the 1, 2, 3 and 4 output terminals of the counter. Only one counter output terminal will be at the high voltage value at any given time. Thus, upon counting in the first clock pulse from counter 152 after resetting the counter, the voltage on the 1 output terminal of counter 172 will go high to the +8 volt value, while the voltages on the remaining output terminals of counter 172 will be at the low +4 volt value, and so on.

The 4 output terminal of counter 172 is connected back to the counter's reset pin so that upon clocking in the fourth pulse from counter 152, counter 172 will reset itself. The count in counter 172 is advanced by the count of 1 for each cycle made by counter 152.

With continuing reference to FIG. 5, amplifier 202 is provided with a network for input resistors 206, 207, 208 and 209. Resistors 206-209 are respectively connected to the 0, 1, 2, and 3 output terminals of counter 172 and feed the negative or inverting input of amplifier 202. The sizes of resistors 206-209 are in progressively decreasing order, with the largest input resistor being connected to the 0 output terminal of counter 172, the second largest input resistor being connected to the 1 output terminal of counter 172, the third largest input resistor being connected to the counter's 2 output terminal, and the smallest input resistor being connected to the counter's output terminal.

A feedback resistor 210 for amplifier 202 is connected between the amplifier's output and negative input terminals as shown. The positive or non-inverting input of amplifier 202 is connected to the positive terminal of a d.c. voltage source 212. The voltage supplied by source 212 is selected to be the same as the low output voltage furnished by counter 172. Thus, for the example of counter output voltages given above, source 212 applies a +4 volts to the non-inverting input of amplifier 202 and is utilized to supply the low voltage source of counter 172. The size of feedback resistor 210 is selected to be significantly smaller than the smallest one of the input resistors 206-209.

With this operational amplifier circuit, the voltage developed at the output of amplifier 202 will mainly depend upon the particular input resistor to which a high of +8 volts is applied by counter 172. The gain of amplifier 202 will therefore incrementally and progressively increase in steps in accordance with the number of pulses counted in by counter 172. Thus, amplifier 202 will initially have the smallest gain at the start of the search cycle since the high of +8 volts will be applied by counter 172 to input resistor 206, which is the largest of all four of the input resistors. As the count in counter 172 advances the gain of amplifier becomes progressively greater due to the progressively decreasing size of the input resistance.

Because of the previously described inverting and non-inverting circuit connections to amplifier 202, the output voltage of amplifier 202 will incrementally and progressively decreases as the gain of amplifier 202 is incrementally increased upon advancing the count in counter 172. By operation of counter 172, therefore, amplifier 202 provides four successively occurring, progressively decreasing d.c. reference or threshold voltages to the negative output terminal of amplifier 200.

As shown in FIG. 5, the output of amplifier 200 is connected by way of resistor 216 to the disabling or inhibiting pin of counter 152. The output of amplifier 200 is also connected by way of base resistor 218 to the base of an NPN transistor Q11. Transistor Q11 has its emitter connected to the positive terminal of source 212 and its collector connected by way of a collector resistor 220 to the positive terminal of source and by way of a coupling capacitor 221 to the reset pin of counter 172. A relatively large resistor 223 (e.g., 1 Megohm) is connected between the reset pin of counter 172 and the +4 volt terminal of source 212. Because of the small IR drop across resistor 223, the resistor is effective during operation to keep the voltage on the reset pin of counter 172 at a relatively low non-resetting value until either the voltage on the counter's 4 output pin goes high to +8 volts or a positive going transition occurs in the collector voltage of transistor Q11 by turning the transistor from its on state to its off state. As shown, the 4 output pin of counter 172 is connected by a diode 225 to the counter's reset pin so that the counter will automatically reset itself on the count-in of every fourth clocking pulse.

A clamping diode 222, which is connected between earth ground and the inhibit pin of counter 152, prevents a negative voltage at the output of amplifier 200 from placing a negative voltage on the counter's inhibit pin. Accordingly, approximately 0 volts will be applied to the inhibit pin of counter 152 when the output of amplifier 200 is negative to permit the counter 152 to continue to clock in pulses from clock 156.

When the output voltage of amplifier 200 goes positive by about 0.6 volts or more, however, diode 222 becomes reverse biased to place a positive voltage on the inhibit pin of counter 152. A positive voltage on the counter's inhibit pin inhibits or disables counter 152 to prevent it from clocking in any additional pulses from clock 156.

On start-up, the pilot signals are first transmitted over transmission lines 32 and 32a–32e followed by the application of power to the search and lock circuit 133. Counters 152 and 172 are of the type that reset upon application of power to apply voltage highs to their 0 output pins. As a result, the highest d.c. reference threshold is applied to amplifier 200 by amplifier 202 and the carrier frequency pilot signal on the transmission line 32 is fed by selector switch 140 to receiver 131 where it is received and detected to set the magnitude of coordination control voltage on line 198. This and all of the other coordination control voltages developed by circuit 132 will depend upon the vary in accordance with the level or amplitude of the particular pilot signal that is being received at the time by receiver 131.

If the receive level of the pilot signal from line 32 is high enough to cause the coordination control voltage on line 198 to be more positive and hence greater than the highest d.c. threshold voltage now at the negative input terminal of amplifier 200, the output of amplifier 200 will rise to a relatively high positive value.

When this happens, a positive voltage is applied to the inhibit pin of counter 152 by reverse biasing diode 222 to disable the counter. Transistor Q2 will therefore be held in its conductive state, while transistors Q3–Q7 will remain in their non-conductive states, thus placing the search and lock circuit 133 in its lock mode where it will continue to feed the pilot signal together with the channel carrier signals from line 32 to receiver 131. The coordination control voltages which are applied by circuit 132 to control the gain oscillators 100–107 will therefore be under the control of the receive level of the pilot signal on transmission line 32 during normal operation of the communication facility.

In addition to inhibiting counter 152, the positive rise of the d.c. voltage at the output of amplifier 200, switches transistor Q11 to its conductive state. The collector voltage of transistor Q11 therefore decreases. The circuit is now prepared to reset counter 172 in the event that the received pilot signal is lost or becomes so weak that it causes the voltage at the output of amplifier 200 to go negative.

If the receive level of the pilot signal on line 32 is not strong enough to make the coordination control voltage on line 198 more positive than the highest d.c. threshold voltage, the output of amplifier 200 will remain negative to keep diode 222 forward biased. The potential on the inhibit pin of counter 152 therefore remains at approximately 0 volts to allow counter 152 to continue to clock in pulses from clock 156. Under this condition counter 152 will advance by the count of 1 on the first clock pulse following reset. Transistor Q2 will therefore turn off and transistor Q3 will turn on.

Now, the pilot signal together with the information channel carrier signals on transmission line 32a will be fed by selector switch 140 to receiver 131 where the pilot signal from line 32a is received and detected, while the information channel carriers are rejected.

If the receive level of the pilot signal from line 32a is strong enough to cause the coordination control voltage on line 198 to be more positive than the highest d.c. threshold voltage, (which is still present at the input of amplifier 200) counter 152 will be inhibited in the manner previously explained to cause circuit 133 to enter its lock mode where the pilot signal from transmission line 32a will continue to be fed to and detected at receiver 131 for establishing all of the coordination control voltages in circuit 132 for the normal operation of the communications facility. If, on the other hand, the pilot signal on line 32a causes the coordination control voltages on line 198 to be less positive than the highest d.c. threshold, the output of amplifier 200 will remain negative and counter 152 will remain in its enabled state to permit the count-in of the next pulse from clock 156.

Upon clocking in the next clock pulse, counter 152 causes transistor Q4 to be driven into its conductive state to feed the pilot signal on line 32b to receiver 131 for reception and detection. If the receive level of the pilot signal on line 32b is strong enough to make the coordination control voltage more positive than the highest threshold voltage, circuit 133 will lock with the pilot signal on line 32b. If the pilot signal on this transmission line is not strong to make the voltage on line 198 more positive than the highest threshold voltage, circuit 133 remains in its search mode and advances next to interrogate the pilot signal on line 32c.

In this fashion, circuit 133 continues to search for a pilot signal on one of the transmission lines 32 and 32a–32e that is strong enough to cause the coordination control voltage on line 198 to be more positive than the highest d.c. threshold voltage. Upon finding such a pilot signal, circuit 133 enters into its lock mode, causing the selected pilot signal to continue to be received and detected at receiver 131. The coordination control voltages developed by circuit 132 will therefore remain under the control of the receive level of the pilot signal with which circuit 133 is locked.

If none of the pilot signals on lines 32 and 32a–32e causes the coordination control voltages on line 198 to be more positive than the highest d.c. threshold, counter 152 will remain in its enabled state after all of the input terminals 144–149 are scanned. Therefore, the count-in of the sixth clock pulse in the first scanning cycle of switch 152 causes a triggering pulse to be fed to counter 172 to advance counter 172 by the count of 1. When this happens, the voltage on the 0 output terminal of counter 172 will go to its low value and the voltage on the 1 output terminal of counter 172 will go to its high +8 volt value. As a result, the d.c. voltage supplied by amplifier 202 will be stepped down to the second highest of the four thresholds made available by resistors 206–209.

Upon clocking in the seventh pulse from clock 156, counter 152 resets itself to start a second scanning cycle by turning on transistor Q2. Like the first scanning cycle, either one of two conditions may occur in the second scanning cycle. First, one or more of the received pilot signals may be strong enough to cause the coordination control voltage on line 198 to be more positive than the second highest d.c. threshold voltage amplifier 200. Alternatively, the receive levels of none of the pilot signals may be large enough to cause the coordination control voltage on line 198 to become more positive than the second highest d.c. threshold voltage from amplifier 202.

If the first condition occurs, the search and lock circuit 133 will lock with the first one of the scanned pilot signals that cuases the coordination control voltage on line 198 to become more positive than the second highest threshold voltage. For example, only the pilot signals from transmission lines 32a and 32b may be strong enough to cause the coordination control voltage on line 198 to be more positive than the second highest threshold voltage, but less positive than the highest of the four threshold voltages. Under these circumstances, circuit 133 will lock with the pilot signal that is transmitted down the line 32a during the second scanning cycle. This pilot signal will then be employed to develop all of the coordination control voltages in the coordination control circuit 132 during normal operation of the carrier installation.

If none of the pilot signals is strong enough to cause the coordination control voltage on line 198 to be more positive than the second highest threshold voltage during the second scanning cycle, counter 152 will remain in its enabled state to advance counter 172 by the count of 1 and to reset itself for a third scanning cycle.

Advancement of the count in counter 172 causes the voltage on the counter's 2 output terminal to go high to its 8 volt value. When this happens, the d.c. voltage at the output of amplifier 202 steps down to the third highest threshold voltage.

If the receive level of none of the pilot signals is strong enough to cause the coordination control voltage on line 198 to be more positive than the third highest threshold voltage, circuit 133 will not lock with any of the pilot signals. As a result, counter 152 will remain in its enabled state to advance the count in counter 172 and to reset itself after scanning all six of the input terminals 144–149. This initiates the fourth scanning cycle in which each pilot signal is scanned in search of one that causes the coordination control voltages on line 198 to be greater than the lowest of the four threshold voltages.

The magnitude of the smallest d.c. threshold voltage is made small enough to insure that circuit 133 will lock with at least one of the pilot signals if transmission conditions of the communication system are normal.

If, due to some abnormal condition, none of the pilot signals is strong enough to cause the coordination control voltage on line 198 to be more positive than the lowest of the four d.c. threshold voltages, counter 152 will remain in its enabled state. Accordingly, counter 172 will advance by the count of 1 upon the count-in of the sixth clock pulse by counter 152 in the fourth scanning cycle, and the counter 152 will reset itself upon counting in the seventh clock pulse. The count in counter 172 will now be advanced to make the voltage at the counter's 4 output pin high at +8 volts, thus forward biasing diode 225. When this happens, counter 172 will reset to make the voltage on its 0 output pin high.

From the foregoing it is clear than both of the counters 152 and 172 will cyclically reset when none of the transmitted pilot signals is strong enough to cause the control voltage on line 198 to be more positive than the lowest d.c. reference or threshold voltage. Under such a condition, circuit 133 will remain in its search mode.

From the foregoing description it will be appreciated that in the first complete cycle made by counter 152 during the search mode of circuit 133, the six pilot signals on lines 32 and 32a–32e, respectively, will successively be received and detected by receiver 131 to provide the coordination control voltage on line 198 with six successive values that respectively correspond to the levels of the received pilot signals. These six coordinating control voltage values, which may or may not be the same, will first be successively compared with the highest d.c. threshold voltage furnished by amplifier 202. In the second scanning cycle made by counter 152 during the search mode, the six pilot signals will again be successively received by receiver 131, and the resulting six coordination control voltage values on line 198 will successively be compared with the next highest d.c. threshold voltage from amplifier 202. In the third cycle made by counter 152 during the search mode of circuit 133, the six pilot signals will be successively received by receiver 131 for the third time, and the six coordination control voltage values on line 198 will successively be compared with the third highest d.c. threshold voltage from amplifier 202. In the fourth scanning cycle made by counter 152 during the search mode of circuit 133, the six pilot signals are once again successively received by receiver 131, and the six resulting coordination control voltage values on line 198 will be successively be compared with the lowest d.c. threshold voltage from amplifier 202.

When no pilot signal is present on the particular one of the selector switch input terminals 144–149 being scanned, the coordination control voltage on line 198 will decrease to some predetermined value (e.g., about +2 volts). This coordination control voltage value is less than the lowest threshold voltage supplied by amplifier 202. Circuit 133 therefore remains in its search mode under this condition.

It will be appreciated that the selection of the lowest threshold voltage value determines the limit of the circuit's operating range. This threshold may, for example, be selected at about −45dbm so that the circuit is operable for transmission line lengths up to and including −45db at the 152kHz pilot signal frequency. The highest of the four threshold voltages is preferably selected at some small value such as −10dbm. The intermediate thresholds may be set at any suitable value such as −20dbm and −30dbm.

If the pilot signal with which lock is acquired is lost for some reason, the coordination control voltage on line 198 will become less than the smallest d.c. threshold voltage furnished by amplifier 202. This causes the voltage at the output of amplifier 200 to go low to remove the inhibit voltage from the inhibit pin of counter 152. In addition, the transition of the voltage at the output of amplifier 200 from its high to low value turns off transistor Q11. The resulting rise in collector voltage at transistor Q11 to the positive d.c. collector supply voltage will therefore be coupled through capacitor 221 to reset counter 172. As a result, counters 152 and 172 will be conditioned to clock in pulses from initiating a new search cycle for another pilot signal.

One major advantage of the search and lock circuit 133 is that it enables just one receiver (namely receiver 131) to be used for all six of the pilot signals or any other number of pilot signals depending upon the number of carrier systems selected to make up the carrier communications facility. Furthermore, with circuit arrangement of this invention, only one filter is required for separating the pilot signals from their associated information channel carrier signals. These features significantly reduce the cost of the overall communications installation.

In addition to the foregoing, the level comparing and discriminating function performed by comparator 142 prevents circuit 133 from acquiring lock with a stray signal or an abnormally weak pilot signal and hence avoids a possibility of miscoordination of the transmit carrier signals from the subscriber transmitting and receiving terminal circuits in terminal unit 52. Additionally, the circuitry thus far described obviates the problem of isolating the output terminal of selector switch 140 from its input terminals to avoid a condition where stray capacitance between one of the selector switch's input terminals and the selector switch's output terminal may couple through a strong enough undesirable signal to cause the circuit to lock at any undesirable input terminal of the selector switch. The significant advantage of circuit 133 is that it will select one of the stronger pilot signals to assure proper and efficient level coordination of the subscriber transmit carrier signals.

It will be noted that all of the pilot signals are picked off from the outputs of filters 119 and 119a–119e for transmittal to receiver 131 before amplification by amplifiers 39 and 39a–39e. The receive levels of the pilot signals at receiver 132 are therefore representative of and vary with the db transmission line loss.

Referring to FIG. 6 again, gain control circuit 194 and its gain controlling operation will now be described in greater detail. As shown, the AGC reference amplifier 193 comprises a bipolar transistor Q12 which is an PNP type in this embodiment. The collector of transistor Q12 is connected by way of a collector resistor 230 to the negative terminal of a suitable d.c. voltage source, such as source 170. The emitter of transistor Q12 is connected by way of an emitter resistor 232 to the base of transistor Q8.

Circuit 194 additionally includes a capacitor 234 that is connected between earth and ground and the base of transistor Q12 to set the base voltage of transistor Q12. The output of amplifier 192 is connected by way of a resistor 236 to the base of transistor Q12 and the upper plate of capacitor 234. As will be described in detail shortly, the purpose of transistor Q12 is to divert a variable, controlled amount of base current away from transistor Q8 for controlling the gain and base voltage of transistor Q8. Resistor 236 and capacitor 234 provide filtering for the AGC loop.

As shown in FIG. 6, the emitter of transistor Q8 is connected directly to earth ground, and the collector of transistor Q8 is connected through the primary winding of transformer 184 and serially connected collector resistors 238 and 240 to the positive terminal of a suitable d.c. voltage source such as source 170. A d.c. biasing voltage divider network comprising resistors 242 and 244 supplies initial bias voltage for transistor Q8. The gain of transistor Q8 is controlled by adjusting the transistor's collector current with the voltage from the emitter of transistor Q12.

Transistor Q9 is suitably biased in such a manner that it will conduct only on the positive half cycles of the incoming pilot signal. Accordingly, when no pilot signal is received by receiver 131 and applied to detector 188, the transistor Q9 will be in its non-conducting state, on the verge of cutting on. The collector voltage of transistor Q8 will therefore be at the positive potential of the collector supply which is indicated at 170. This high, positive collector voltage is preferably large enough to drive the output of amplifier 192 to its most positive value. Capacitor 234 is therefore charged to a positive voltage on its upper plate to hold transistor Q12 in its non-conductive state. A diode 246 connected across capacitor 234 clamps the voltage on capacitor 234 and thus prevents capacitor 234 from being charged all the way up to the high positive voltage at the output of amplifier 192. Diode 246 thus provides a fast AGC response time.

As long as Q12 remains non-conductive, no emitter current will be drawn and consequently no base current will be diverted away from transistor Q8. Accordingly, all of the available base current is fed to transistor Q8. The gain of amplifier 182 is therefore maximized when no pilot signal is received by receiver 131. The pilot signal upon being received will therefore be initially amplified by the maximum gain. Further amplification of the incoming pilot signal is accomplished by amplifier 186 to drive transistor Q9 into conduction on the positive pilot signal alternations.

When transistor Q9 conducts, its collector voltage decreases negatively to drive the output voltage of amplifier 192 negatively to a negative value. Capacitor 234 will therefore begin to discharge towards this negative value at the output of amplifier 192.

When capacitor 234 discharges down to about 0 volts, transistor Q12 will be biased into conduction to draw emitter current. As a result, transistor Q12 will begin to divert base-emitter current away from transistor Q8. Reduction of the emitter current for transistor Q8 reduces the collector current for transistor Q8 to reduce the gain of amplifier 182. Accordingly, the variable voltage gain of transistor Q8 will be current controlled by conduction of transistor Q12.

From the foregoing it will be appreciated that the negative output voltage of amplifier 192 will vary negatively by a magnitude corresponding to average of the detected signal voltage on the collector of transistor Q9. The negative value of the voltage at the output of amplifier 192 therefore varies with the pilot signal receive level before transistor Q12 starts to conduct so that it will be more negative for larger pilot signal receive levels, and less negative for smaller pilot signal levels. The negative output voltage of amplifier 192 in turn controls the extent to which transistor Q12 conducts. The extent to which transistor Q12 conducts and hence the magnitude of emitter current that it draws therefore varies in accordance with the average voltage on the collector of transistor Q9. Since the amount of biasing current flowing through the base-emitter junction of transistor Q8 is reduced by the amount of emitter current drawn by transistor Q12, the extent to which transistor Q8 conducts and its emitter current will be controlled by transistor Q12 when the latter conducts.

Accordingly, upon reception and detection of a pilot signal by receiver 131, the d.c. emitter current of transistor Q8 will be reduced by the amount of emitter current drawn by transistor Q12 and hence by an amount corresponding to the level of the received pilot signal. As a result, the collector signal current of transistor Q8 is reduced by an amount varying with the emitter current drawn by transistor Q12 to correspondingly reduce the gain of transistor Q8. The signal output voltage on the collector of transistor Q8 therefore decreases to decrease the magnitude of the average voltage on the collector of transistor Q9 and hence the negative bias on the base of transistor Q12.

Thus, upon reception and detection of a pilot signal in receiver 131, the gain of transistor Q8 will be decreased to drive the average voltage (i.e., the average of the detected signal voltage) on the collector of transistor Q9 toward a pre-selected fixed reference that causes transistor Q12 to stop conducting. In the illustrated embodiment this reference is set near 0 volts (ground potential) by transistor Q12 due to the connection of the emitter of transistor Q8 directly to earth ground and the cancellation of the drop across the base-emitter junction of transistor Q8 by the drop across the base-emitter junction of transistor Q12. Thus, no current is diverted through resistor 232 when the voltage on the base of transistor Q12 is zero.

The db change in collector current and hence change in gain of transistor Q8 for driving the average voltage on the collector of transistor Q9 to or close to 0 volt reference will be equal to the db difference between the actual transmission line length at the 152kHz pilot frequency and some predetermined reference transmission line length at 152kHz. If, for example, the reference line length is selected at −40db at the 152kHz pilot frequency and the actual transmission line length between terminal units 50 and 52 is 0db (signifying no transmission line loss) the gain and collector current of transistor Q8 will decrease by 40db to drive the average of the detected pilot signal on the collector of transistor Q9 to the zero reference. If, as a further example, the actual transmission line length is −25db at the 152kHz pilot frequency, the decrease in gain and collector current of transistor Q8 will be 15db.

Thus, the gain of transistor Q8 is so controlled by gain control circuit 194 that the carrier level at the transistor's collector is maintained constant at a value that causes the average of the detected pilot signal voltage on the collector of transistor Q9 to stabilize approximately at or close to 0 volts. Upon stabilizing, the average of the detected voltage on the collector of transistor Q9 will not change to an appreciable extent during normal operation and will only vary about ±0.1 volts. If the received pilot carrier level slowly increases the voltage on the base of transistor Q12 drops, causing the voltage on the base of transistor Q8 to drop. This lowers the gain of transistor Q8, returning the carrier level at the collector of transistor Q8 to its original value.

From the foregoing it is clear that gain control circuit 194 provides a closed loop automatic gain control between the input and output of transistor Q8 and automatically changes the db gain of transistor Q8 by an amount that is about equal to the difference between some reference level (e.g., −40db at the pilot signal frequency) and the actual transmission line length or signal loss at the pilot signal frequency.

The base-emitter voltage of transistor Q8, which is the input voltage for the coordination control circuit 132, will vary as a function of and in accordance with the current through the base-emitter junction of transistor Q8. The relationship between the transistor's base-emitter voltage and emitter current is established by the following equation:

$$V_{be} = K \ln I/I_o \qquad (1)$$

where $V_{be}$ is the voltage across the base-emitter junction of transistor Q8, I is the current flowing through the base-emitter junction of transistor Q8, $I_o$ is the leakage current through the base-emitter junction of transistor Q8, and K is a constant at a given ambient temperature and is equal to about 0.026mV at 25° C (i.e., room temperature).

Putting $V_{be}$ in terms of log-to-the-base of 10 at 25° C:

$$V_{be} = 0.06 \log_{10} I/I_o \qquad (2)$$

From the foregoing it is apparent that the base-emitter voltage of transistor Q8 will vary with I. Accordingly, $V_{be}$ decreases as I is decreased, and I is decreased by diverting current through the base-emitter junction of transistor Q12. From equation (1), the change in $V_{be}$ (i.e., $\Delta V_{be}$) for a change in I at 25° C or, more particularly, emitter current of Q8, from value $I_1$ to value $I_2$ will be:

$$V_{be} = 0.026 (\ln I_2/I_o - \ln I_1/I_o) = 0.026 (\ln I_2 - \ln I_1) \qquad (3)$$

$$= 0.026 \ln I_2/I_1 \qquad (4)$$

Since the collector current is approximately equal to the emitter current, it is apparent that the base-emitter voltage of transistor Q8 will be a function of and vary with the collector current. Furthermore, the base-emitter voltage ($V_{be}$) of Q8 will change by a uniform or constant, predetermined magnitude for each db change in emitter current and hence collector current of transistor Q8. Since the db gain of transistor Q8 is proportional to the transistor's db collector current, it is also apparent that the base-emitter voltage of Q8 will change by a uniform or constant magnitude for each db change in the transistor's gain. For example, this change in $V_{be}$ will be approximately 3mV for each db change in collector current or gain of transistor Q8. The 3mV change may be shown by restating equation (2) as follows:

$$V_{be} = (0.026/0.434 \times 20) 20\log_{10} I/I_o = 0.003 (20\log_{10} I/I_o), \qquad (5)$$

where $20\log_{10} I/I_o$ is the db value of the current ratio.

Hence, the change in $V_{be}$ for a change in I from $I_1$ to $I_2$ will be:

$$\Delta V_{be} = 0.003 (20\log_{10} I_2/I_1), \qquad (6)$$

When the change in collector current (I) is such that $20\log I_2/I_1$ becomes equal to 1db, it is apparent from equation (6) that the change in base-emitter voltage ($\Delta V_{be}$) will be 3mV. If the collector current of transistor Q8 is referenced at some suitable value (e.g., 1mA for a −40db transmission line length at the 152kHz pilot signal frequency), then for a change in transmission line length from −40db to 0db at 152 kHz will reduce the collector current to one-hundredth of its original value, or 10μA for the example given above because the collector current will decrease by 40db and because $20\log_{10} 1/100$ is equal to −40db. For this change from −40db to 0db, the base-emitter voltage of transistor Q8 will decrease by 3mV × 40 or 120mV. As a further example, assume that the transmission line length is −25db at the 152kHz pilot signal frequency. Then the decrease in $V_{be}$ from reference value corresponding to a −40db transmission line length will only be 3mV × 15 or 45mV. In the illustrated embodiment component sizes are so selected that transistor Q8 pulls 1mA of collector current when the transmission line length is −40db (at 152kHz), thus making the transistor's base voltage 0.7 volts when the transmission line length is −40db.

From the foregoing description it is apparent that the collector current of transistor Q8 is inversely proportional to the pilot signal input voltage and that the transistor's base voltage is proportional to the log of the collector current. The base voltage for transistor Q8 thus varies with the pilot carrier signal loss and changes 3mV for each 1db change in the pilot signal loss. The change in the base voltage of transistor Q8 from a nominal reference (i.e., 0.7 volts for the illustrated embodiment) is therefore a measure of the signal loss at 152kHz and hence the transmission line length at the 152kHz pilot frequency.

Due to the gain control of circuit 194, it will be appreciated that receiver 131 converts an input current — which may be taken as the emitter current or the collector current of transistor Q8 — into a logarithmic voltage, namely the base emitter voltage of transistor Q8. This relationship of output voltage to input current is shown in FIG. 8. Receiver 131 therefore performs the function of a log converter whose output — namely the base-emitter voltage of transistor Q8 — is applied to the input of the coordination control circuit 132.

Figure 7:
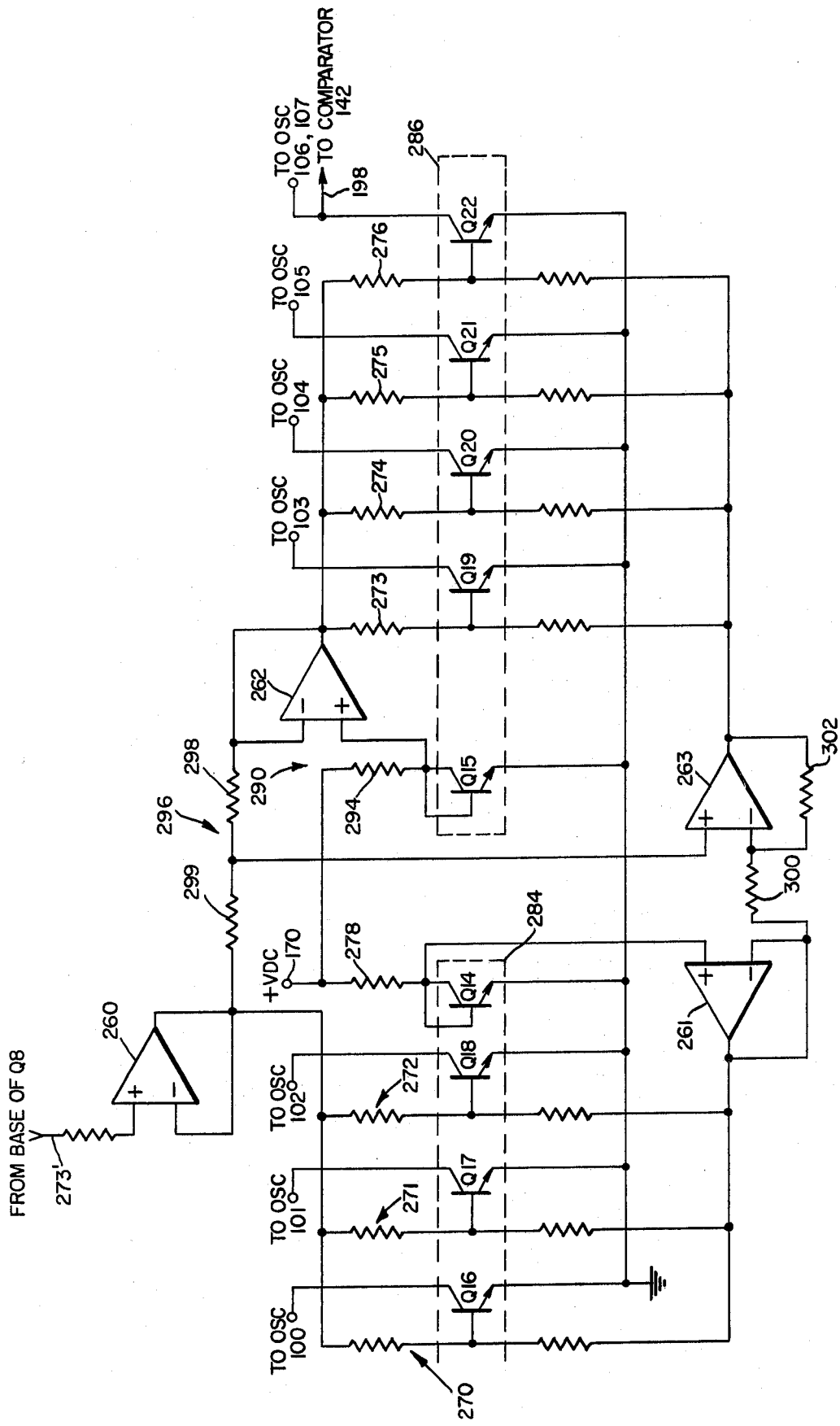
FIG. 7 is a schematic circuit diagram of the automatic coordination control circuit shown in FIG. 1B.

Referring to FIG. 7, the coordination control circuit 132 in this embodiment comprises four operational amplifiers 260, 261, 262 and 263, a pair of NPN transistors Q14 and Q15 for supplying reference currents, and an array of NPN transistors Q16, Q17, Q18, Q19, Q20, Q21 and Q22 for developing the coordination control voltages that determine the signal levels of oscillators 100-107.

As shown, the emitters of transistors Q16–Q22 are all connected to earth ground. The collectors of transistors Q16, Q17 Q18, Q19, Q20 and Q21 are respectively connected to oscillators 100, 101, 102, 103, 104 and 105 and the collector of transistor Q22 is connected to both of the oscillators 106 and 107. Additionally, the positive voltage on the collector of transistor Q22 is applied to line 198 to provide the voltage at the non-inverting input of amplifier 200 in comparator 142. The voltage on the collector of transistor Q22 therefore determines the voltage that is compared with the reference voltage at the input of amplifier 200.

The coordination control voltages developed by circuit 132 for oscillators 100–107 are taken from the collectors of transistors Q16–Q22. As will become apparent shortly, all of these collectors voltages are derived from the single input voltage which is taken from the base of transistor Q8.

In this embodiment, the adjustable peak voltage amplitudes of oscillators 100–105 are respectively controlled by the collector voltages of transistors Q16–Q21 while the adjustable peak voltage amplitudes of both of the remaining oscillators 106 and 107 are controlled by the voltage on the collector of transistor Q22. The voltage on the collector of each of the transistors Q16–Q22 is determined by the transistor's collector current, and the collector current, in turn, is determined by the transistor's base bias.

The adjustable carrier signal levels of oscillators 100–107 are so controlled by the collectors currents of transistors Q16–Q22 that they vary with the controlling collector currents and change by the same pre-selected amount for the same change in collector current. In the illustrated embodiment the level of each oscillator 100–107 will change by 1db for each 1db change in its controlling collector current.

The levels of the carrier signals transmitted from the subscriber terminal circuits in terminal unit 52 are determined by the transmit oscillators (100–107) from which they originate and are proportional to the signal levels produced by their originating oscillators. Thus, the levels of all six of the carriers transmitted from the channel 1 subscriber terminal circuits (namely STU1, STU1a, etc.) are proportional to the level of carrier frequency signal generated by oscillator 100, the level of all six of the carriers transmitted from the channel 2 subscriber terminal circuits (namely STU2, STU2a, etc.) are proportional to the level of the signal generated by oscillator 101, and so on.

As shown in FIG. 7, separate voltage dividers 270, 271, 272, 273, 274, 275, and 276 establish the base bias for transistors Q16–Q22, respectively. The portion of circuit 132 containing transistors Q14 and Q16–Q18, dividers 270–272 and amplifiers 260 and 261 will be described first, followed by the description of the circuit portion containing transistors Q15 and Q19–Q22, dividers 273–276 and amplifiers 262 and 263.

Dividers 270–272, which set the base bias for transistors Q16–Q18, respectively, are connected in parallel between the outputs of amplifiers 260 and 261. As shown, each of the dividers 270–272 consists of a pair of resistors connected in series between the outputs of amplifiers 260 and 261. With this biasing circuitry, the base of transistor Q16 is d.c. biased by the voltage divider action of the resistors in divider 270, the base of transistor Q17 is d.c. biased by the voltage divider action of the resistors in divider 271, and the base of transistor Q18 is d.c. biased by the voltage divider action of the resistors in divider 272. The biasing voltages on the bases of transistors Q16–Q18 are therefore determined by the values of the resistors in dividers 270–272, respectively, and by the output voltages of amplifiers 260 and 261.

As shown in FIG. 7, the variable voltage on the base of transistor Q8 is applied by way of a line 273' to the non-inverting terminal of amplifier 260. Amplifier 260 is connected as a voltage follower so that its output voltage will follow the base-emitter voltage of transistor Q8. The voltage at the output of amplifier 261 is employed as a reference and is set by transistor Q14.

As shown, the positive terminal of a suitable d.c. voltage source, such as source 170, is connected through a collector load resistor 278 to provide positive voltage at the collector of transistor Q14. The emitter of transistor Q14 is connected directly to earth ground. Transistor Q14 is connected as a diode by having its base and collector interconnected. The collector voltage and the base-emitter voltage of transistor Q14 are therefore equal. The collector of transistor Q14 is d.c. coupled to the non-inverting terminal of amplifier 261 to feed the base-emitter voltage of transistor Q14 to the operational amplifier's non-inverting input. Like amplifier 260, amplifier 261 is also connected as a voltage follower so that the voltage at its output will follow the base-emitter voltage of transistor Q14. Transistor Q14 provides a reference collector current which determines the fixed reference voltage at the output of amplifier 261. The base voltages of transistors Q8 and Q14 are respectively buffered by amplifiers 260 and 261 for driving the required to load. Amplifiers 260 and 261 cooperate to establish the voltage across dividers 270–272 which, in turn, determine the base bias for transistors Q16–Q18, respectively. The base bias for each of these transistors in turn, determines the transistor's collector current, and the amount of collector current pulled by each transistor Q16–Q18 determines the carrier signal level for the oscillator that it controls.

In the illustrated embodiment, transistor Q8, Q14 and Q16–Q18 are required to be matching and are preferably contained on the same IC chip. Accordingly, the collector currents of these transistors will change by the same db amount for the same change in base-emitter voltage and vise versa.

The collector current drawn by transistor Q14 is constant at a given temperature and is selected by chosing the size of the collector load to be equal to the collector current drawn by transistor Q8 at a pre-selected transmission line length. For example, the collector current pulled by transistor Q14 may be set at 1mA so that it will be equal to the collector current drawn by transistor Q8 when the transmission line length is −40db at the 152kHz pilot frequency. Because the collector current is constant and because the base-emitter current is the same as the collector current, the base-emitter voltage of transistor Q14 will also be constant and will be about 0.7 volts for 1mA of collector current at room temperature.

For a −40db transmission line length (at 152kHz), therefore, the base voltage of transistor Q14 and hence the output voltage of amplifier 261 will be equal to the base voltage of transistor Q8 and to the voltage at the output of amplifier 260 since transistors Q8 and Q14 are matching. As a result, no current flows through dividers 270–272 when the transmission line length is −40db (i.e., the signal loss at the pilot frequency of 152kHz).

Figure 9:
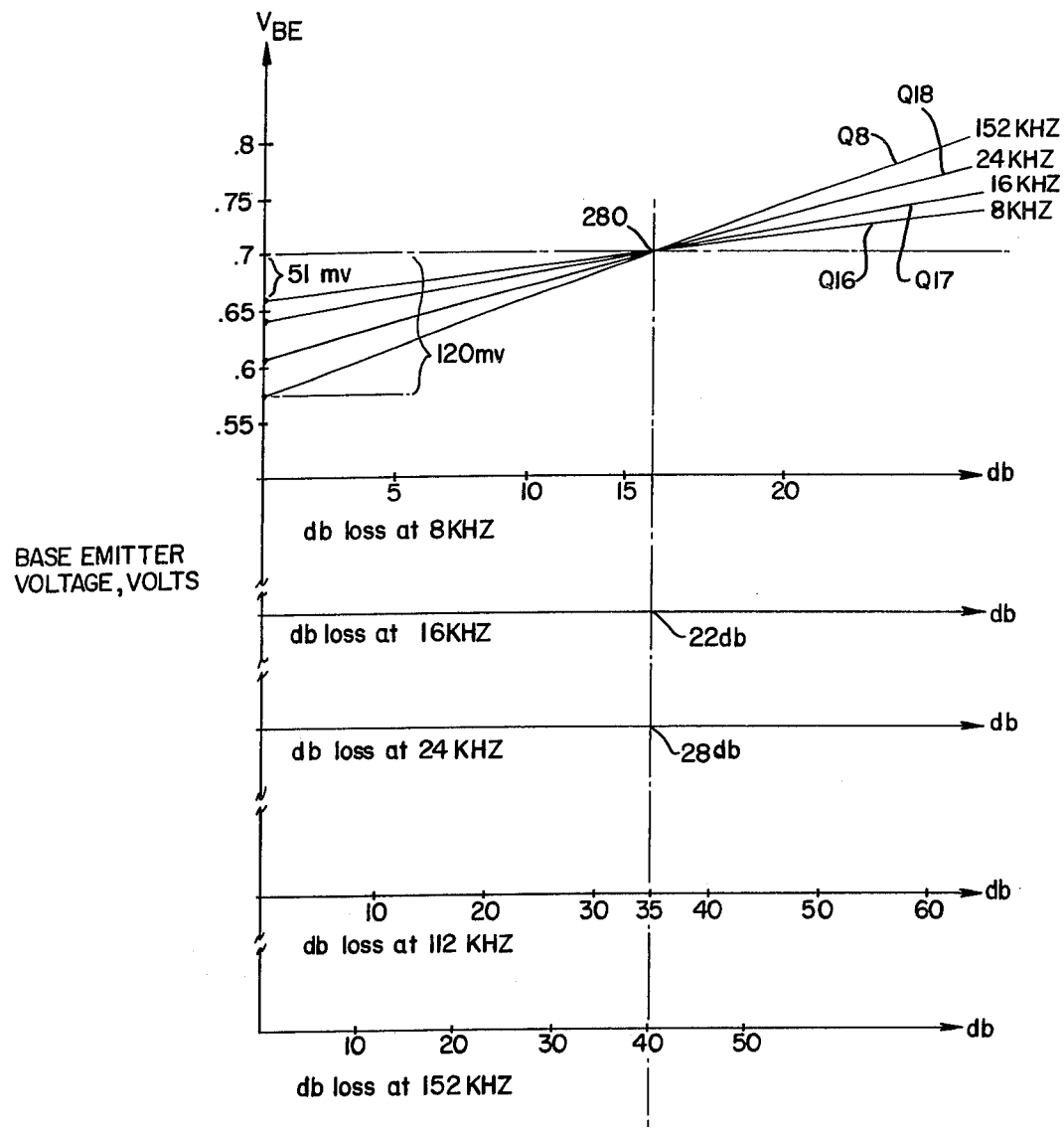
FIG. 9 is a plot of base-emitter voltage vs. signal loss for a family of curves at different carrier frequencies to show the variation of base-emitter control voltages in the automatic coordination control circuitry.

Thus, for a −40db transmission line length, the base voltages of transistors Q16–Q18 will be equal to the base voltage of transistor Q8 as well as the base voltage of transistor Q14 as signified by the common crossover point at 280 in FIG. 9. As a result, the collector currents drawn by transistors Q16–Q18 will also be the same and equal to the collector current drawn by transistor Q8 (namely 1mA for the example given above).

Since the d.c. base-emitter voltage of transistor Q8 varies with the transmission line length or signal loss at the pilot carrier frequency, it and the voltage at the output of amplifier 260 will deviate from the 0.7 volt reference at the output of amplifier 261 when the actual transmission line length or signal loss at the 152kHz pilot frequency is not equal to the nominal −40db reference. The magnitude of deviation and hence the difference between the voltages at the outputs of amplifiers 260 and 261 will depend upon and vary in accordance with the db difference between the actual transmission line length or signal loss at 152kHz and the nominal transmission line length of −40db. If this difference is some value Y, then, according to the previously given example, the difference between the output voltage of amplifiers 260 and 261 will be Y times 3mV. For example, if the actual transmission line length of signal loss is 0db, then the difference between voltages at the outputs of amplifiers 260 and 261 will be 40db × 3mV/db or 120mV.

Dividers 270–272 divide down the voltage difference between the outputs of amplifiers 260 and 261 by different amounts depending upon the carrier operating frequencies of oscillators 100–102. In the illustrated embodiment the operating frequency of oscillator 100 is 8kHz. The loss of the 8kHz carrier is only about 17db on a transmission line length that results in a 40db loss at the 152kHz pilot frequency. Thus, a 40db change in transmission line length at the 152kHz pilot frequency from the −40db reference to 0db results in a change of only about 17db in the 8kHz carrier. The change in base voltage of transistor Q16 from the reference of 0.7 volts is therefore required to be 3mV/db × 17db or 51mV.

Accordingly, the sizes of the resistors in divider 270 are selected to divide down the voltage difference between the outputs of amplifiers 260 and 261 by 51/120 or 17/40 so that the change in the base voltage of transistor Q16 from 0.7 volts reference will only be 17/40 times the voltage difference across dividers 270 and 272.

Since transistors Q8, Q14 and Q16 are all matched, each 3mV change in the base-emitter voltage of transistor Q16 will result in a 1db change n the transistor's collector current. For a 0db transmission line length, therefore, the collector current of transistor Q16 will drop by 51/3 or 17db from the 1mA reference. Since the level of the carrier signal generated by oscillator 100 changes 1db for each db change in the collector current of transistor Q16, the sizes of the two resistors in divider 270 consequently determine how many db the oscillator level changes for each db change in the pilot signal receive level from the −40db reference.

The sizes of the resistors in each of the other two dividers 271 and 272 are selected in a manner corresponding to that just described for divider 270. In the case of oscillator 101, however, the 16kHz carrier signal will be attenuated by about 22db on a transmission line length that causes a 40db loss in the 152kHz pilot carrier, and the 24kHz carrier signal generated by oscillator 102 will attenuate by about 24db for the same −40db transmission line length.

Accordingly, the sizes of the resistors in divider 271 are selected to divide down the applied difference between voltages at the outputs of amplifiers 260 and 261 by 22/40, while the sizes of resistors in divider 272 are selected to divide down the same applied difference by 24/40. The change in base voltage on transistor Q17 from the 0.7 volt difference will therefore be 22/40 of the voltage difference between the outputs of amplifier 260 and 261, while the change in the voltage on the base of transistor Q18 will be 24/40 of the applied difference voltage.

For a 0db transmission line length it is apparent from the foregoing that the decrease in the base-emitter voltage of transistor Q17 from the 0.7 volt reference will be 22/40 × 120mV or 66mV and that the decrease in the base-emitter voltage of transistor Q18 from the 0.7 volt reference will be 24/40 × 120mV or 72mV.

Since each of the transistors Q17 and Q18 is matching with transistors Q8, Q14 and Q16, the collector current of each transistor will change 1db for each 3mV change in base-emitter voltage. The collector currents of transistors Q17 and Q18 will therefore decrease by 22db and 24db, respectively, from the 1mA reference for a transmission line length of 0db as compared with the 17db decrease in the collector current of Q16.

Like oscillator 100, the levels of oscillators 101 and 102 also change 1db for each 1db change in the collector currents of transistors Q17 and Q18, respectively.

Thus for a change in transmission line length from −40db at the 152kHz pilot frequency to 0db, the carrier signal levels generated by oscillators 101 and 102 will drop 22db and 24db, respectively, as compared with the 17db drop in the level of oscillator 100.

From FIG. 9 it is apparent that the base-emitter voltages of transistors Q8 and Q16–Q18 vary linearly with respect to the associated db signal losses. The base-emitter voltages of the remaining coordination control transistors Q19–Q22 also vary linearly with respect the db signal loss, and the unshown, straight line base-emitter voltage curves for transistors Q19–Q22 will also cross over at point 280 if transistors Q19–Q22 are matching with transistors Q16–Q18.

For economy in manufacture, it is desirable, wherever practical, to use IC transistors in making the various circuits shown in the drawings herein. Chips containing arrays of IC transistors are inexpensive and are particularly convenient to use in the coordination control circuit 132 because of the relatively large number of coordination control transistors needed in the circuit. Chips are additionally advantageous for use in circuit 132 because the transistors on each chip are matching.

Low cost, commercially available chips, however, only contain a maximum of five transistors per chip. Two five-transistor chips are therefore needed to accommodate transistors Q8, Q14 and Q16–Q22. In the illustrated embodiment, transistors Q8, Q14 and Q16–Q18 are contained on one chip which is indicated at 284 in FIG. 7, and the remaining coordination control transistors Q19–Q22 are on the second chip which is indicated at 286 in FIG. 7.

Being on the same chip, transistors Q8, Q14 and Q16–Q18 are matching. The collector currents pulled by these transistors will consequently be equal for the same base-emitter voltage and will change by the same amount for the same change in base-emitter voltage. Proper coordination of the carrier signals supplied by oscillators 100–102 is therefore assured.

Since transistors Q19–Q22 are on a separate chip, a potential coordination control problem arises because there is no guaranteed base-emitter voltage match between the array of transistors Q19–Q22 on the second chip and the array of transistors Q8, Q14 and Q16–Q18 on the first chip. Unless these two arrays are carefully matched, amplifiers 260 and 261 cannot be used to supply the base drive for transistors Q19–Q22 by directly connecting dividers 273–276 in parallel with dividers 270–272. If this were done with mismatching transistor arrays, the levels of the carrier signals supplied by oscillators 103–107 would not be coordinated properly because transistors Q19–Q22 would not pull the same amount of collector current as transistors Q8, Q14 and Q16–Q18 for the same base-emitter voltage.

Figure 10:
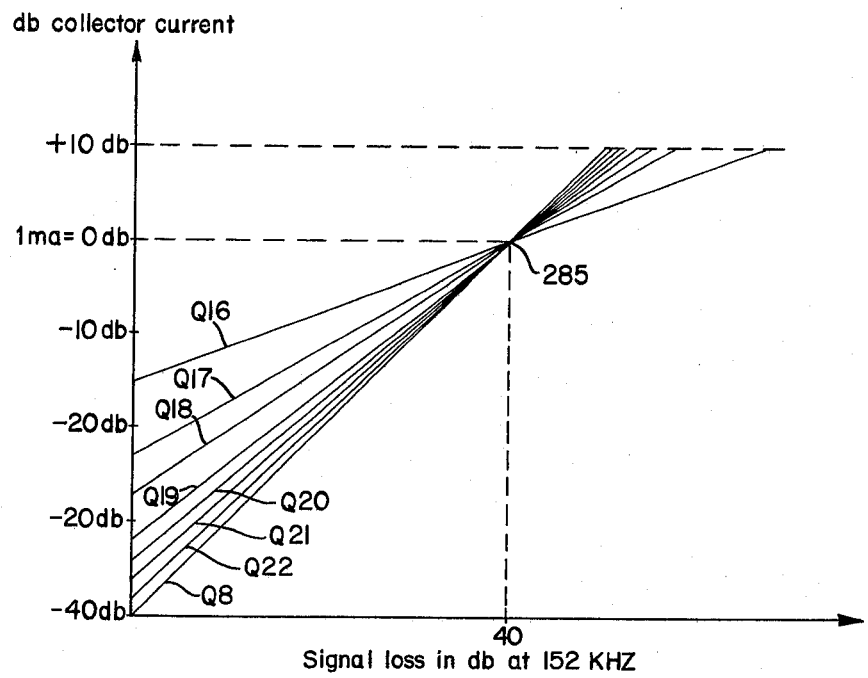
FIG. 10 is a plot of collector current vs. signal loss for a family of curves representing the collector current outputs of the automatic coordination control circuit shown in FIG. 7.

To offset any existing mismatch between the two IC transistor arrays, a novel referencing circuit 290 is employed and comprises amplifiers 262 and 263 and transistor Q15. Circuit 290, as described in detail below, serves to bias the coordination control transistors Q19–Q22 at 1mA of collector current when transistor Q8 draws 1mA so that the straight line, db collector current curves for all of the transistors Q8 and Q14–Q22 have a single, common crossover as indicated at 285 in FIG. 10. Transistor Q16–Q18 and Q19–Q22, therefore, will all pull 1mA of collector current at the crossover point when the collector current of transistor Q8 equals the 1mA collector current reference of transistor Q14. This places the common crossover point 285 at the signal loss of −40db at the 152kHz pilot frequency as shown in FIG. 10.

As shown in FIG. 7, the positive terminal of voltage source 270 is connected through a collector load resistor 294 to provide positive voltage at the collector of transistor Q15. The emitter of transistor Q15, as previously mentioned is connected to ground along with the emitters of transistors Q19–Q22.

Transistor Q15 is connected as a diode in the same manner as transistor Q14 by having its base and collector interconnected. The collector voltage and base-emitter voltage of transistor Q15 are therefore the same.

Like transistor Q14, transistor Q15 serves as a referencing transistor by having its collector load sized to draw the same amount of collector reference current (1mA) as transistor Q14. Each of the chips 284 and 286 therefore has its own referencing transistor or, more particularly PN diode junction, drawing equal amounts of current. If a mismatch exists between the two transistor arrays on chips 284 and 286 then the base-emitter voltage of transistor Q15 will not be the same as the base-emitter voltage of transistor Q14.

The base-emitter referencing voltage of transistor Q15 is applied to the positive input of amplifier 262. Dividers 273–276 are all connected in parallel between the outputs of amplifiers 262 and 263 as shown. Amplifier 262 is connected as a voltage follower so that its output voltage is equal to and follows the base-emitter referencing voltage of transistor Q15. Amplifier 262 accordingly serves as a unity gain buffer for driving transistors Q19–Q22.

Still referring to FIG. 7, circuit 290 additionally comprises a voltage divider 296 consisting of a pair of equally sized resistors 298 and 299 which are connected in series between the outputs of amplifiers 260 and 262. The junction of resistors 298 and 299 is connected to the positive input terminal of amplifier 263 so that the amplifier's positive input is fed by the voltage divider action of resistors 298 and 299.

The voltage at the positive input of amplifier 263 is therefore varies with the difference between the voltages at the outputs of amplifiers 260 and 262 and, consequently, with the difference between the base-emitter reference voltage of transistor Q15 and the base-emitter voltage of transistor Q8. More particularly, the voltage $V_1$, at the positive input terminal of amplifier 263 will be as follows:

$$V_1 = V_{Q15} + (V_{Q8} - V_{Q15})/R_{298} + R_{299}(R_{298}), \quad (7)$$

where $V_{Q15}$ is the base-emitter referencing voltage of transistor Q15, $V_{Q8}$ is the base-emitter voltage of transistor Q8, R298 is the resistance value of resistor 298 and R299 is the resistance value of resistor 299.

Since resistors 298 and 299 are equally sized in this embodiment, the equation for voltage $V_1$ becomes:

$$V_1 = 1/2 (V_{Q15} + V_{Q8}) \quad (8)$$

As shown, a resistor 300 is connected between the output of amplifier 261 and the negative input terminal of amplifier 263 for feeding the amplifier's negative input. Amplifier 263 has a negative resistive feedback 302 sized to equal resistor 298. For the illustrated connections, amplifier 263 serves as a positive and negative summing amplifier. The output voltage, $v_{263}$ of amplifier 263 will therefore be as follows:

$$V_{263} = 2V_1 - V_{Q14} = V_{Q15} + V_{Q8} - V_{Q14}, \quad (9)$$

where $V_{Q14}$ is the voltage at the output of amplifier 261 and hence the base-emitter reference voltage of transistor Q14 and where $V_1$, $V_{Q15}$ and $V_{Q8}$ are the same as given above for the equations 7 and 8.

Since the voltage at the output of amplifier 262 is equal to the base-emitter reference voltage ($V_{Q15}$) of transistor Q15, then the voltage applied to the base of transistor Q19 by the voltage divider action of the resistors in divider 273 will be:

$$V_b = V_{Q15} + V_{Q8} - V_{Q14} + V_{Q15} - (V_{Q15} + V_{Q8} - V_{Q14})/(R_1 + R_2)(R_2) \quad (10)$$

where $R_1$ is the size of the upper resistor in divider 273 and $R_2$ is the size of the lower resistor in divider 273.

Simplifying equation (10), the base-emitter voltage of transistor Q19 becomes:

$$V_b = V_{Q15} + K(V_{Q8} - V_{Q14}), \quad (11)$$

where $$K = (1 - R_2/R_1 + R_2)$$

The base-emitter voltage for each of the remaining coordination control transistors Q20–Q22 will be the same as that indicated above in equation (11) except that the value of K for each of the transistor Q19–Q22 will be different because of the different resistor sizes in dividers 273–276. The sizes of the resistors in dividers 273–275 are determined by the operating frequencies of oscillators 103–105, respectively. The sizes of the resistors in divider 276 are determined in accordance with either one of the operating frequencies of oscillators 106 and 107 or a median value between the two oscillator operating frequencies since transistor Q22 controls the levels of both oscillators. Selection of the resistor sizes in dividers 273–276 corresponds to that described for dividers 270–272.

From equation (11), it is apparent that when the pilot carrier signal loss is of such value to cause the base-emitter voltage of transistor Q8 to equal the base-emitter reference voltage of transistor Q14 (namely, 0.7 volts in the previous example) then the base-emitter voltages of all of the transistors Q19–Q22 become equal to the base-emitter reference voltage of transistor Q15. Since transistors Q15 and Q19–Q22 are matching then the collector currents pulled by transistors Q19–Q22 under this condition will be equal to the referencing collector current of transistor Q15 and consequently to the collector currents drawn by transistors Q8 and Q16–Q18.

For a transmission line length of −40db at the 152kHz pilot carrier frequency the collector currents pulled by all of the transistors Q8 and Q16–Q22 will therefore by equal to the 1mA reference. The straight line collector current curves for all of the transistors Q8 and Q16–Q22 consequently have a common cross-over at the 1mA reference current as shown in FIG. 10.

When the actual signal loss at the 152kHz pilot frequency is greater or smaller than the nominal −40db reference, the amount of collector current pulled by transistor Q8 will be greater or smaller than the 1mA reference depending upon the length of the transmission line. Accordingly, the term $K(V_{Q8} - V_{Q14})$ will become a finite positive or negative value depending upon whether the loss at the 152kHz pilot frequency is larger or smaller than −40db and will be proportional to the difference between the base-emitter voltage of transistor Q8 and the 0.7 volt reference.

Thus, for equal changes in the base-emitter voltages of transistors Q16–Q22, the collector currents pulled by transistors Q19–Q22 will change by an amount closely equal to the change in the collector currents drawn by transistors Q16–Q18. In other words, the collector current pulled by each of the transistors Q19–Q22 will also change by about 1db for each 3mV change in its base-emitter voltage.

The foregoing description demonstrates that the coordination control transistors Q19–Q22 on chip 286 will have the same collector current tracking characteristics as the transistors on chip 284 even though the two chips are not thermally related. Proper level coordination on oscillators 103–107 is therefore achieved even though there is a mismatch between chips 284 and 286. Thus, by sizing the resistors in dividers 270–276 in the manner previously described the level of each oscillator 100–107 will automatically be changed by an amount at least approximately equal to the carrier line loss at the oscillator's operating frequency regardless of the actual transmission line length.

From the foregoing description it will be appreciated that each of the dividers 270–276 represents a constant gain circuit having a different voltage gain of less than 1 and that each coordination control transistor Q16–Q22 represents an antilogarithm converter. Accordingly, transistor Q8 taken together with the coordination circuit 132 constitutes a log-antilog converter system having a single current input and multiple current outputs as shown in block diagram form in FIG. 8.

In FIG. 8, only three constant gain circuits and three antilog converters are shown to simplify the illustration, although it will be appreciated that there are as many constant gain circuits as there are dividers (270–276) and that there are as many antilog converters as there are coordination control transistors (Q16–Q22). The log converter, which is comprised of transistor Q8, is indicated at 310, the constant gain circuits are indicated at 312, 313, and 314, and the antilog converters are indicated at 316, 317 and 318.

The output voltage of log converter 310 is the base-emitter voltage of transistor Q8 and is proportional to the log of the input current ratio $I/I_o$ where I is either the collector current or emitter current of transistor Q8 and $I_o$ is the transistor's base-emitter leakage current as previously described.

The output voltage $V_{be}$ of log converter 310 is applied as an input of all of the constant gain circuits 312–314. The output voltage of each constant gain circuit is its voltage gain multiplied by the input voltage change ($\Delta V_{be}$). The different voltage gains ($A_{V1}$, $A_{V2}$, $A_{V3}$, etc.) of the constant gain circuits are all less than unity for the illustrated embodiment since they are comprised of the voltage dividers 270–276. Alternatively, dividers 270–276 may be replaced by amplifiers, making the different gains greater than unity or negative.

The output voltages for the three constant gain circuits shown in FIG. 8 are indicated at $V_a$, $V_b$ and $V_c$. These voltages are applied as inputs to their associated antilog converters 316–318, respectively.

The antilog converters 316–318 convert their respective input voltages ($V_a$, $V_b$, $V_c$) into current ratios $I_1/I_o'$, $I_2/I_o'$, and $I_3/I_o'$, respectively. Each of these current ratios is proportional to the antilog of its associated input voltage. Currents $I_1$, $I_2$ and $I_3$, which are taken as the output currents, are the collector currents for transistors Q16–Q18, respectively. Currents $I_o'$ are the transistors' leakage currents.

From FIG. 8 it is now apparent that the different output current ratios of the antilog converters 316–318 are proportional to the antilog of the input current ratio $I/I_o$. Taking antilog converter 316 as an example:

$$I_1/I_o' = \log^{-1}(A_{V1} \log_{10} I/I_o) \qquad (12)$$
$$= (I/I_o)A_{V1}$$

Therefore, $$I_1(db) = A_{V1} I(db), \qquad (13)$$

thus making the db output current $I_1$ equal to the db input current I times the gain $A_{V1}$ of the associated constant gain circuit.

Apart from certain component values, the programmable, level controlled oscillators 100–107 are all identical in circuit construction. Accordingly, only one oscillator, namely oscillator 100, will be described in detail. It will be appreciated, however, that the circuit description pertaining to oscillator 100 is equally applicable to oscillators 101–107.

Figure 11:
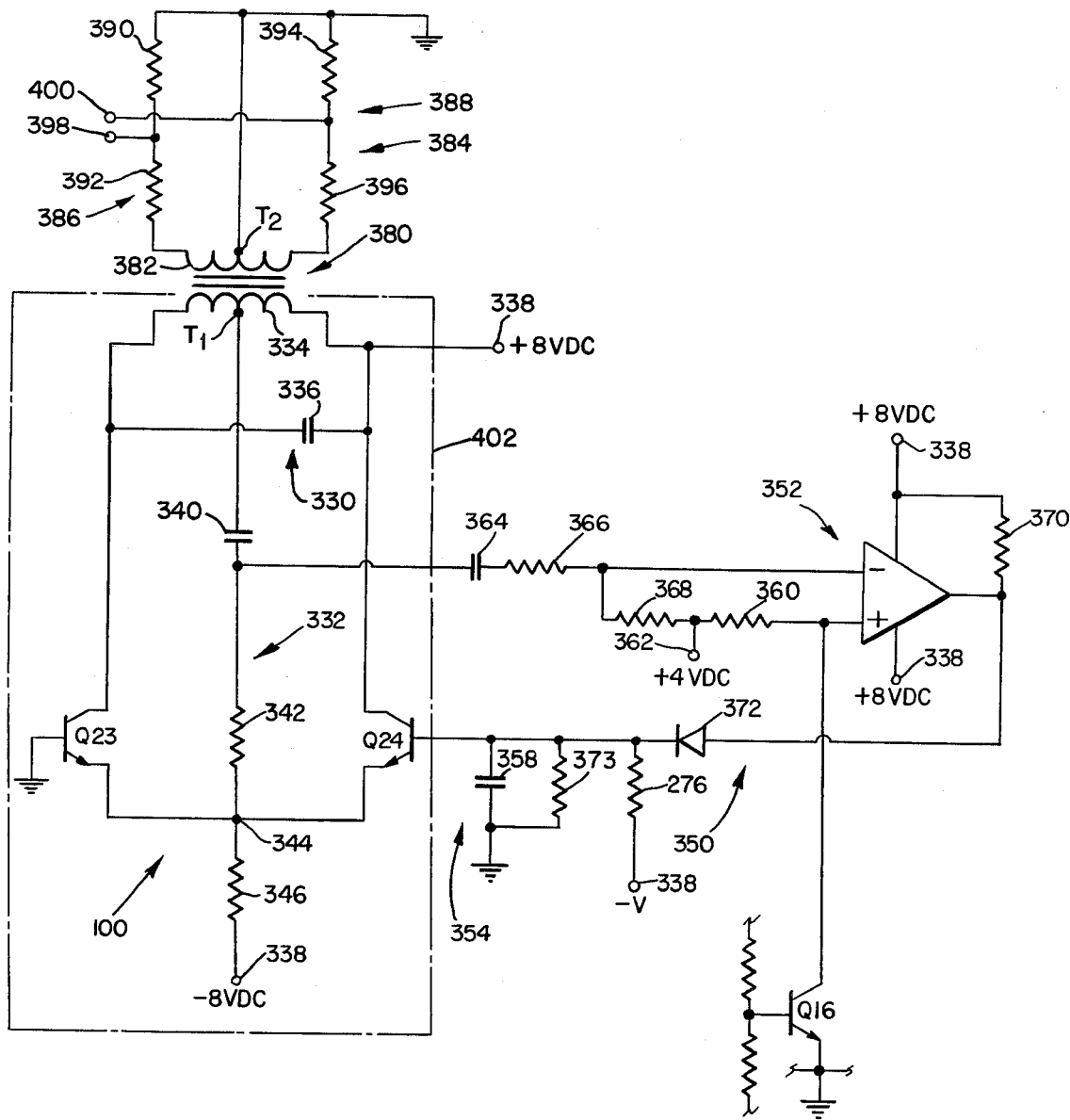
FIG. 11 is a schematic circuit diagram of one of the subscriber transmit oscillators shown in FIG. 1B.

Referring to FIG. 11, oscillator 100 is shown to be a low distortion Hartley feedback type oscillator which oscillates at a gain-dependent level. Oscillator 100 generally comprises a tuned wave-forming tank circuit 330, a signal amplifying transistor Q23, a current steering transistor Q24, and a positive, adjustable feedback 332. The adjustable feedback is used to control the level of the carrier signal developed by oscillator 100 and is under the control of the coordination control collector voltage developed by transistor Q16. Although a Hartley oscillator is disclosed in the illustrated embodiment, it will be appreciated that the principles of this invention are also applicable to other types of feedback oscillators.

Tank circuit 330 comprises a coil or inductor 334 in parallel with a capacitor 336. The capacitance of capacitor 336 is selected to set the oscillator's operating frequency. For the previously given carrier frequency allocation the size of capacitor 336 is so selected to provide oscillator 100 with an 8kHz operating frequency. The waveform developed by tank circuit 330 is sinusoidal.

Transistor Q23 is operated as a common base amplifier which has its output connected to feedback tank circuit 330 to sustain oscillations. In this embodiment, transistor Q23 is an NPN bipolar transistor and is biased for class A operation. The collector of transistor Q23 is connected through tank circuit 330 to the positive a.c. grounded terminal of a suitable d.c. collector power supply source 338. The base of transistor Q23 is connected directly to earth ground as shown. The right hand side of tank circuit 10, as viewed from FIG. 11, is at a.c. ground by virtue of being coupled to ground through an unshown capacitor in source 338.

The feedback 332 is connected between a tap $T_1$ on coil 334 and the emitter of transistor Q23 and provides positive a.c. feedback for the oscillator. As shown, feedback 332 is comprised of a d.c. blocking capacitor in series with a resistor 342. The collector current of transistor Q23 is stepped up on tap $T_1$, and the current out of tap $T_1$ is coupled by capacitor 340 into resistor 342 which sets the maximum loop gain and establishes the Q of tank circuit 330.

Transistor Q24 is also an NPN bipolar transistor as shown. The emitters of transistors Q23 and Q24 are directly d.c. coupled together at a common node 334 without any intervening resistance or other impedance. The emitters of both transistors Q23 and Q24 are returned through a common resistor 346 to the negative terminal of the d.c. source 340. Resistor 346, which determines the total emitter bias current at node 344, provides an approximately constant current emitter bias. Resistor 346 and source 340 thus constitute an approximately constant current source for feeding the emitters of transistors Q23 and Q24. The magnitude of the total emitter current flowing out of node 344 thus remains approximately constant regardless of the conduction level of transistor Q24.

As shown in FIG. 11, the collector of transistor Q24 is coupled to the positive, a.c. grounded terminal of source 338 so that when transistor Q24 conducts it provides an a.c. grounded bypass around transistor Q23 and tank circuit 330. When transistor Q24 conducts the emitter bias current through resistor 346 is shared by transistors Q23 and Q24. Upon conducting, transistor Q24 therefore attenuates the a.c. feedback current in resistor 342 by an amount determined by the emitter bias current split between transistors Q23 and Q24. The gain of transistor Q23, however, remains constant. Conduction of transistor Q24 is controlled by controlling its base bias in a manner to be described shortly.

When the base biasing voltage of transistor Q24 does not exceed the transistor's emitter biasing voltage by at least approximately 0.6 volts, in the case of silicon transistors, transistor Q24 will be in cutoff. Under this condition, all of the biasing current flowing in resistor 346 will flow in the emitter of transistor Q23, and none will be diverted through the emitter of transistor Q24. Therefore, the input impedance ($r_e$) seen looking into the emitter of transistor Q23 will be reduced to a minimum because $r_e = 26/I_E$ where $I_E$ is the emitter biasing current in mA. Additionally, the impedance seen looking into the emitter of Q24 will approach infinity so that no portion of the alternating feedback current, which is developed at node 344, is diverted and bypassed by transistor Q24. Instead, the entire magnitude of the a.c. feedback will flow in the emitter of transistor Q23. Accordingly, the resulting variations of the collector current for transistor Q23 will be at a maximum to maximize the amplitude of the a.c. output.

When the biasing voltage on the base of transistor Q24 increases to a value which is at least approximately 0.6 volts more positive than the emitter biasing voltage, transistor Q24 begins to conduct so that a portion of the total emitter biasing current at node 344 will not flow in the emitter of transistor Q24. The total biasing current through resistor 346, however, remains approximately constant.

Therefore, the magnitude of biasing current flowing in the emitter of transistor Q23 will decrease approximately by the amount of the increase in biasing current in the emitter of transistor Q24, and the magnitude of biasing current in the emitter of transistor Q24 will be determined by and vary with the base-emitter biasing voltage of Q24.

Accordingly, when transistor Q24 is driven into conduction, the impedance seen looking into the emitter of transistor Q24 will decrease, while the impedance seen looking into the emitter of transistor Q23 will increase. The value of the impedance seen looking into the emitter of each of the transistors Q23 and Q24 will vary inversely with respect to the magnitude of emitter biasing current for the particular transistor.

The feedback current developed at node 344 will therefore divide when transistor Q24 conducts so that a portion of the feedback current will flow through the emitter and collector of transistor Q24 to a.c. ground at the positive terminal of source 338. Upon entering into conduction, transistor Q24 thus bypasses a portion of the alternating feedback current and transistor Q23 and tank circuit 330 to reduce the amplitude of alternating current in the emitter of transistor Q23. Since the amplitude of a.c. component in the collector of transistor Q23 is about equal to and varies with the amplitude of the emitter a.c. component, the amplitude of the a.c. voltage across tank circuit 330 decreases.

The oscillator's a.c. output voltage will vary inversely with respect to the base-emitter voltage of transistor Q24 when transistor Q24 is conducting. Thus, as transistor Q24 conducts more strongly, the oscillator's a.c. voltage level across tank circuit 330 decreases. The oscillator output level can therefore be controlled by bypassing a controlled amount of feedback current through transistor Q24.

The principles of the oscillator thus far described are disclosed in copending application Ser. No. 685,253 which was filed on May 11, 1976, for LOW DISTORTION FEEDBACK OSCILLATOR AND GAIN CONTROL CIRCUITS and which is assigned to the assignee of this application. The oscillator circuit of the present invention differs from the circuit disclosed in the above-identified, earlier filed application mainly in the transistor bias control for attenuating the feedback and in the design of the oscillator output circuit.

In the present invention, the base bias for the current steering transistor Q24 is determined by an automatic level control circuit 350 (see FIG. 11). Circuit 350, as will now be described, operates to vary the base bias of transistor Q24 in accordance with the magnitude by which the amplitude of the oscillator's sinusoidal output voltage exceeds a predetermined threshold or reference voltage value. This reference is established by the coordination control collector voltage of tansistor Q16.

To accomplish the foregoing function circuit 350 is shown in this embodiment to comprise a comparator 352 and an integrator 354. Comparator 352 is preferably of the high speed type. Integrator 352 consists of a capacitor 358 connected between the base of transistor Q24 and earth ground.

As shown, the collector of transistor Q16 is connected to the non-inverting input terminal of comparator 352 and through a collector load resistor 360 to the positive terminal of a suitable d.c. collector power supply source 362. With these circuit connections, the collector voltage of transistor Q16 is applied to the non-inverting input of comparator 352 and varies inversely with respect to the magnitude of collector current which transistor Q16 causes to flow through resistor 360. The collector current of transistor Q16 thus establishes the referencing voltage for comparator action with the oscillator output level in circuit 350.

Still referring to FIG. 11, the sinusoidal input generated by oscillator 100 is fed to the inverting input of amplifier 356 by way of a d.c. blocking coupling capacitor 364 and an input resistor 366. Capacitor 364 and resistor 366 are connected in series between the inverting input of amplifier 356 and the junction between capacitor 340 and resistor 342 in the feedback for oscillator 100.

The positive terminal of source 362 is also connected through a resistor 368 to the inverting input of comparator 352. Thus, the sinusoidal voltage developed by oscillator 100 will be superimposed upon or ride on the constant positive d.c. voltage supplied by source 362 so that the voltage at the inverting input of amplifier 356 will have an a.c. component and a d.c. component as depicted in FIG. 12.

Figure 12:
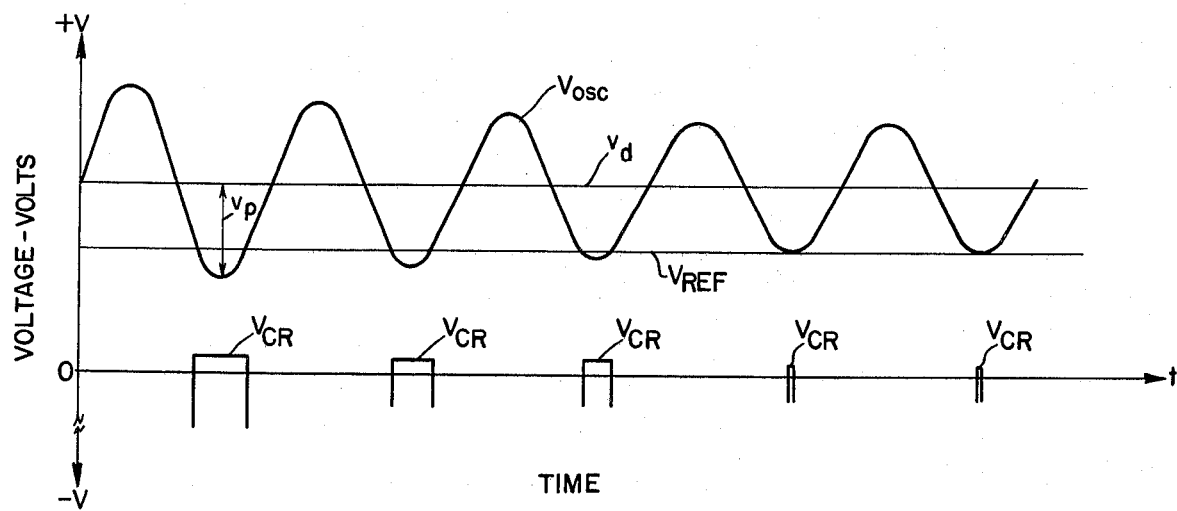
FIG. 12 is a plot of voltage vs. time for various voltages that are petinent to the operation of the level control circuit for the subscriber transmit oscillator.

In FIG. 12, the a.c. component (namely, the sinusoidal voltage developed by oscillator 100 is indicated at $v_{osc}$, and the positive d.c. component is indicated at $v_d$. The d.c. component is about equal to the positive voltage of source 362 and is sufficiently positive to prevent the negative going peaks of voltage $v_{osc}$ from becoming negative for the maximum level that oscillator 100 is capable of generating. Accordingly, the a.c. oscillator component $v_{osc}$ will be positive throughout its full cycle.

The positive referencing or collector voltage established by the collector current of the coordination control transistor Q16 is indicated at $V_{REF}$ in FIG. 12. Voltage $V_{REF}$ will be less positive than the d.c. component $V_d$ during normal operation because transistor Q16 is conducting. The difference between $V_d$ and $V_{REF}$ will vary in accordance with the magnitude of collector current pulled by transistor Q16.

As shown in FIG. 11, the power terminals of comparator 352 are connected to the positive and negative terminals of source 338, and the comparator's output is connected through a load resistor 370 to the positive terminal of source 338. The voltage supplied by source 338 is about twice as great as that supplied by source 362. The output of comparator 352 is also connected through a diode 372 to the upper plate of capacitor 358, and the capacitor's upper plate is tied to the base of transistor Q24 to establish the transistor's base bias.

The circuit design for comparator 352 is such that when the voltage at its inverting input is equal to or more positive than the voltage at its non-inverting input, the comparator's unshown output transistor (whose collector is connected through resistor 370 to the positive terminal of source 338) is saturated. As a result, the voltage at the output of comparator 352 (i.e., the collector voltage of the comparator's output transistor) will be closely at the negative voltage of source 338. This negative source voltage may, for example be −8VDC.

The negative voltage at the output of comparator 352 reverse biases diode 372 to thereby prevent a charging current from being fed to capacitor 358. This is the condition that normally exists in the oscillator operation when the level of the carrier signal generated by oscillator 100 is at the desired magnitude that is set by the collector voltage ($V_{REF}$) of transistor Q16.

If the voltage at the inverting input of comparator 352 becomes negative with respect to the reference voltage $V_{REF}$ at the comparator's non-inverting input, the voltage at the output of comparator 352 becomes positive and increases positively toward the positive voltage of source 338 to forward bias diode 372. As a result, diode 372 conducts current to charge capacitor 354. This builds up positive voltage on the upper plate of capacitor 354. The discharge path for a charge stored on capacitor 354 is through a resistor 373.

When the positive voltage on capacitor 354 rises to about 0.6 volts above the emitter voltage of transistor Q24, transistor Q24 will be driven into conduction to bypass feedback current away from the emitter of transistor Q24 and to thereby attenuate the positive feedback developed at the input side of transistor Q23.

When transistor Q24 conducts the oscillator's output power level (in other words, the oscillator's peak amplitude) decreases. The peak amplitude of the a.c. component $v_{osc}$ at the inverting input of comparator 352 therefore decreases toward the value established by the reference voltage. The extent of decrease in the oscillator power level varies with the extent to which transistor Q24 conducts, and the conduction of transistor Q24 varies with the positive voltage buildup on capacitor 358.

The maximum oscillator output power level occurs when transistor Q24 is non-conducting and is set by resistor 342 to greatly exceed the reference voltage $V_{REF}$. As a reslt, the peak amplitude of oscillator output voltage will always be forced by the control action of circuit 350 to stabilize at the reference voltage $V_{REF}$.

Considering an instance in which the peak negative swing of the oscillator signal $v_{osc}$ exceeds the reference voltage $V_{REF}$ as shown in FIG. 12, the output of comparator 352 becomes positive for the time interval in which the negative going peak swing of the oscillator component $v_{osc}$ is less positive than the reference voltage $V_{REF}$ to develop a positive voltage pulse $V_{CR}$ (see FIG. 12) that forward biases diode 372. Diode 372 therefore conducts a capacitor charging current pulse whose width is the same as the voltage pulse $V_{CR}$.

The width of the charging current pulse will therefore depend upon the maximum or peak swing of the oscillator's negative going alternation. More specifically it will be proportional to the algebraic sum of $V_{REF} - (V_d - v_p)$, where $v_p$ is peak amplitude of the oscillator component $v_{osc}$.

The positive voltage built up on capacitor 358 will vary with the width of the charging current pulse and therefore with the extent to which the peak negative swing of the oscillator component $v_{osc}$ exceeds the reference voltage $V_{REF}$. Accordingly, the extent to which transistor Q24 conducts and, hence, the extent of the resulting decrease in the oscillator level will vary in accordance with the extent to which the negative going peak swing of the oscillator's voltage $v_{osc}$ exceeds the reference voltage $V_{REF}$.

As the oscillator output level is forced to decrease, the widths of the voltage pulses $V_{CR}$ and hence the widths of the capacitor charging current pulses becomes smaller and smaller as shown in FIG. 12, until the oscillator output voltage stabilizes at the level at which its peak amplitude no longer exceeds the voltage reference. At stabilization, the maximum or peak amplitude of the oscillator signal $v_{osc}$ will be equal to the difference between voltages $v_d$ and $V_{REF}$. To maintain stabilization only very narrow capacitor charging pulses, as signified by the narrow voltage pulses $V_{CR}$, may be required to hold the peak amplitude of the oscillator voltage at the desired value.

A further resistor 276 is advantageously connected between the upper plate of capacitor 358 and the negative terminal of source 338 to temporarily keep transistor Q24 from conducting on start-up of the oscillator. Resistor 276 therefore allows maximum oscillation prior to automatic level control action of circuit 350 to effect a relatively fast and reliable start-up of oscillator 100.

As shown in FIG. 11, coil 334 is the primary of a transformer 380. The secondary of transformer 380 is indicated at 382 and may be a center tap single turn winding. Transformer 380 feeds the oscillator's output circuit which is indicated at 384. In this embodiment, output circuit 384 comprises a pair of parallel connected voltage dividers 386 and 388.

Divider 386 consists of a pair of series connected resistors 390 and 392. Divider 388 similarly consists of a pair of series connected resistors 394 and 396.

The upper terminal ends of dividers 386 and 388 and the center tap T₂ on the transformer secondary 382 are all connected to earth ground. The transformer secondary 382 is connected across the lower terminal ends of dividers 386 and 388 as shown.

The output voltage of oscillator 100 is developed across terminals 398 and 400. Terminal 398 is connected to the junction between resistors 390 and 392, and terminal 300 is connected to the junction between resistors 394 and 396 as shown.

From the foregoing circuit description it will be appreciated that the oscillator output circuit 384 is a constant gain circuit having an voltage gain that is less than unity. The oscillator voltage across tank circuit 330 is therefore divided down by output circuit 384 so that the oscillator output voltage across terminals 398 and 400 will be equal to some constant, pre-selected value $K_1$ times the oscillator voltage across coil 334.

The purpose of output circuit 384 is to set the oscillator's output at a desired level as will be described in greater detail shortly. Output circuit 384 additionally provides a balanced output to inhibit crosstalk.

Figure 13:
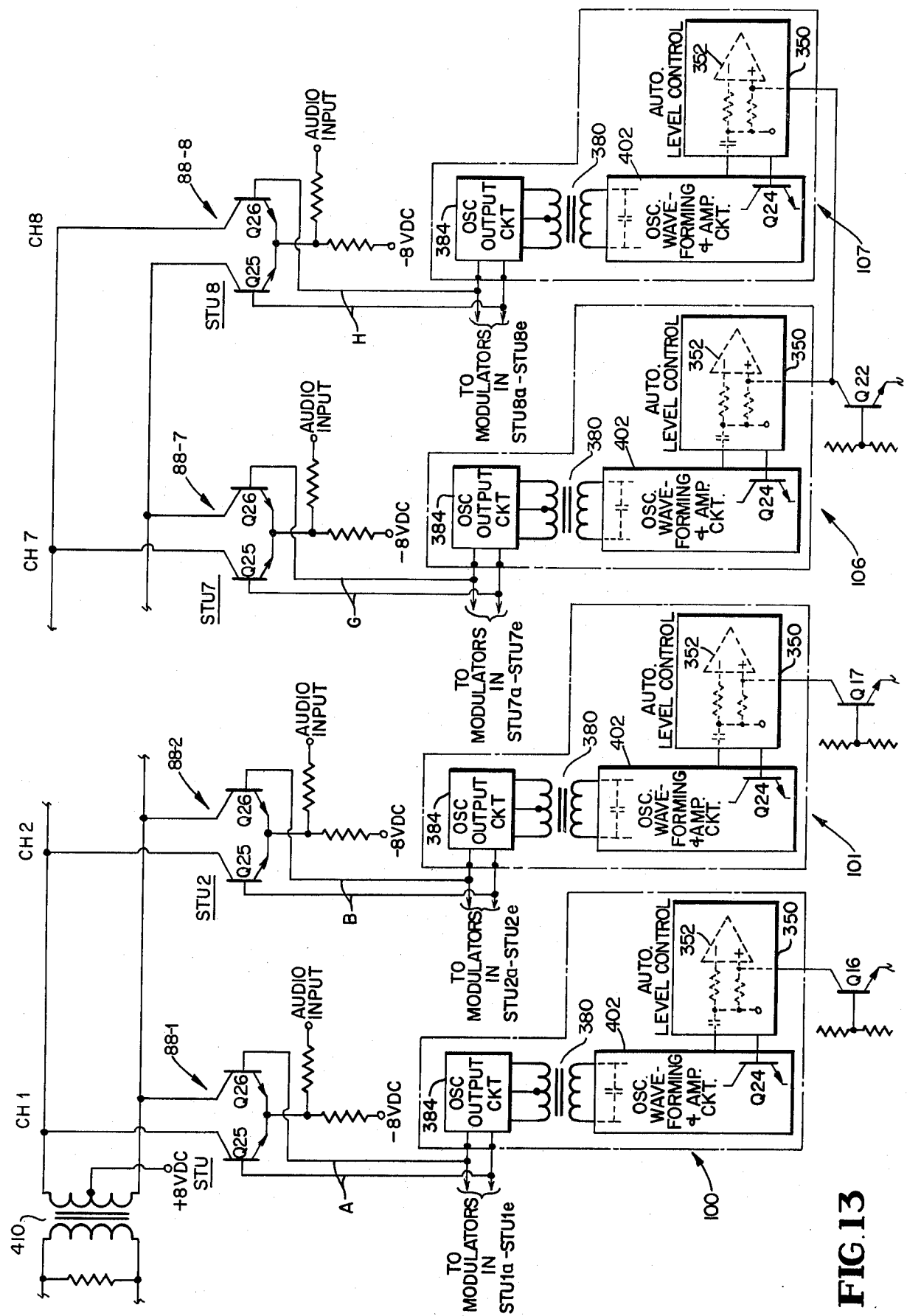
FIG. 13 is a schematic diagram showing a number of the subscriber transmit oscillators and corresponding subscriber transmit modulators.

From the foregoing description it will be appreciated that oscillator 100 may be regarded as being comprises of three circuits. The first circuit, as indicated at 402 in FIG. 13, is the oscillator's wave-forming feedback and amplification circuit which comprises tank circuit 330, transistors Q23 and Q24 and feedback 332. The second circuit is the oscillator's automatic level control circuit 350, and the third circuit is the oscillator's output circuit 384. Alternatively, the automatic level control circuit 350 and transistor Q24 may be regarded as being separate from oscillator 100, and part of the level coordination circuit 132.

In FIG. 13 only oscillators 100, 101, 106 and 107 are shown in box diagram form together with the associated modulators in subscriber terminal circuits STU1, STU2, STU7 and STU8. The circuitry for oscillators 102–105 together with the modulator connections in subscriber terminal circuits STU3–STU6 are omitted to simplify the illustration. Like reference characters have been employed in FIG. 13 to designate like circuits and componentry of the oscillators. Operation of oscillators 101–107 is identical to that just described for oscillator 100.

Except for the size of the tank circuit capacitors 336, the wave-forming and amplifying circuits 402 of oscillators 100–107 are identical. The tank circuit capacitors for oscillators 100–107 are of different sizes to establish the different operating frequencies of the oscillators. The output circuits 384 of oscillators 100–107 are identical except for the sizing of certain resistors in dividers 386 and 388. The gains of output circuit 384 are therefore different for a purpose to be explained later on. The automatic level control circuits 350 for oscillators 100–107 may also be identical. It will be noted from FIG. 13, that the collector of transistor Q22 is connected both non-inverting inputs of the comparators 352 in oscillators 106 and 107 so that collector current pulled by transistor Q22 will establish equal reference voltages ($V_{REF}$) for the two automatic level control circuits of oscillators 106 and 107.

The collector reference voltage ($V_{REF}$) established by the collector currents of transistors Q16–Q22 will depend upon the measured transmission line length and the associated oscillator operating frequencies. These reference voltages will be different from each other except when the collector currents are all equal to 1mA at their common crossover. All of the reference voltages for oscillators 100–107 will therefore be equal to each other when the measured transmission line length is −40db at the 152kHz pilot carrier frequency.

As a result, the oscillator voltage levels developed across the tank circuits 330 of oscillators 100–107 will be equal for a measured signal loss of −40db at the pilot carrier frequency. However, since voltage gains of the output circuits 384 for oscillators 100–107 differ, then the oscillator output levels developed across the output terminals 398 and 400 of oscillators 100–107 will differ from each other.

Any suitable modulators may be employed with the subscriber transmit oscillators in the subscriber terminal circuits. In the illustrated embodiment the modulator 88 in each subscriber terminal circuit is a differential amplifier as indicated at 88-1 through 88-8 in FIG. 13. Each of the differential amplifier modulators comprises a pair of emitter coupled bipolar transistors Q25 and Q26.

In each subscriber terminal circuit, the modulating audio or VF signal is coupled to the emitters of transistors Q25 and Q26. The carrier signal from the appropriate subscriber transmit oscillator (100–107) is differentially fed into the bases of the differential amplifier's transistors for modulation by the audio in the manner shown in FIG. 13. Thus, the carrier from oscillator 100 drives the bases of modulating transistors Q24 and Q25 in each of the channel 1 subscriber terminal circuits, the carrier from oscillator 101 drives the bases of the two modulating transistors in each of the channel 2 subscriber terminal circuits, and so on.

The differential output of each modulator 88 is taken from the collectors of transistors Q25 and Q26 and will be an AM DSB carrier signal. Modulation occurs by causing the emitter current of transistors Q25 and Q26 to vary with the audio or VF signal, thus varying the gain of the differential amplifier. The outputs of the differential amplifier modulators is a relatively low level differential current signal derived from the collectors of the differential transistor pairs.

For carrier system 21, the collector of transistor Q25 in each subscriber terminal circuit STU1–STU8 is directly d.c. coupled to one primary winding terminal of a transmit transformer 410 and the collector of the transistor Q26 in each of the subscriber terminal circuits STU1–STU8 is directly d.c. coupled to the other primary winding terminal of transformer 410.

Accordingly, all eight of the subscriber transmit modulatiors 88-1 through 88-8 are paralleled across the primary of transformer 410 in the manner shown in FIG. 13 and have their outputs summed into the transformer. Transformer 402 receives positive operating voltages from a center tap on its primary and converts the balanced input into a single ended input for amplifier 40 (see FIG. 2).

Because oscillators 100–107 and modulators 88 develop low distortion signals, the need for transmit bandpass filters is eliminated. Since carrier systems 21–26 are identical, it is understood that the modulator and carrier transmit circuitry for systems 22–26 is the same as that just described for carrier system 21.

The amplifying circuitry between each oscillator output at terminals 398 and 400 and the transmission lines 32 and 32a–32e is at least approximately constant. The subscriber transmit carrier power levels applied to the transmission lines will therefore be at least closely proportional to their associated oscillator output power levels. The output power level of each oscillator 100-107, in turn, will be a function of the constant preselected gain of its output circuit 384 and the reference voltage $V_{REF}$ that is established in its automatic level control circuit 350.

In the illustrated embodiment, the carrier signals in the separate communication facilities (e.g., 20 and 20') making up the overall installation are so adjusted that they all arrive back at the central office at the same, pre-selected level regardless of the differences in the carrier frequencies. One suitable level at the central office is about −36db for 22 gauge cable.

To cause all of the carrier signals to arrive back at the central office at the −36db level, the gain of each oscillator output circuit 384 is selectively established as a function of the transmission line loss at its associated carrier frequency. The oscillator output circuit gain is set by selecting the sizes of certain voltage divider resistors (e.g., resistors 392 and 396). The sizes of these voltage divider resistors may be determined by the carrier line loss that exists for the transmission line length where all of the collector currents of transistors Q16–Q22 are equal to make the reference voltages $V_{REF}$ equal. In the previous example, this condition occurs on a transmission line length of −40db at the pilot carrier frequency.

On such a 22 gauge transmission line length the loss of the 8kHz carrier that is generated by oscillator 100 will be about 17db. Accordingly, the sizes of resistors 392 and 396 in oscillator 100 are selected in such a manner that the 8kHz carrier signal will be transmitted at a level of −36dbm + 17dbm or −19dbm when the measured transmission line length is −40db at the pilot carrier frequency. The sizes of the corresponding resistors in oscillator 101 are sized in a similar fashion to make the transmit level of the 16kHz carrier signal −36dbm + 22dmb or −14dbm when the measured transmission line length is −40db at 152kHz. As a further example, the sizes of resistors 392 and 396 in oscillator 102 are so selected that the 24kHz subscriber carrier will be transmitted at −36dbm + 24dbm or −12dbm when the measured transmission line length is −40db at 152kHz.

From the foregoing example, it is apparent that the constant gains of the output circuits 384 for oscillators 100-107 will vary according to the oscillator operating frequencies, being greater for higher frequencies and smaller for lower operating frequencies. Thus, by setting the different gains of the oscillator output circuits 384 and by varying the oscillators' reference voltages ($V_{REF}$) in the manner previously described, automatic carrier level coordination is achieved. It will also be appreciated from the foregoing examples, that all of the subscriber carrier signals will be transmitted at the same level, namely =36db, for a transmission line length of 0db.

When automatic carrier level coordination is achieved by adjustment of the subscriber transmit levels, it will be appreciated from the foregoing discussion that at any given distance from the remote termination (e.g., the central office) along the cable 55 or transmission lines, the level of each carrier signal on each line remains approximately the same regardless of the transmission line length.

With the subscriber transmit oscillator circuit just described, the feedback-attenuating level control circuit 350 has the effect of adjusting the oscillator's gain very little from unity for achieving a wide range of adjustment in the power of the oscillator's output signal. In the illustrated embodiment an adjustment of the oscillator's gain from unity to about 1.01 results in about a 30db to 40db adjustment in the oscillator's output signal level. Therefore, the oscillator's gain remains virtually at unity to provide a very low distortion oscillator output signal. A low distortion oscillator output is of particular significance in order to avoid the use of subscriber transmit bandpass filters. It will be noted that the resistor 370 is sufficiently large (e.g., 10kΩ) to establish a constant current source for charging capacitor 358 when the output of comparator 352 goes positive.

Referring back to FIGS. 9 and 10, it will be noted that the common base-emoitter voltage crossover 280 and the common collector current crossover 285 occur at the same signal loss of −40db at the 152kHz pilot carrier frequency. In FIG. 9, it will be observiced that the base-emitter voltages for each of the transistors Q8 and Q16–Q18 vary linearly with respect to the db signal loss. Each of these base-emitter voltages thus increases linearly as the measured db length of the transmission line increases. The unshown curves plotting the base-emitter voltage against signal loss for transistor Q19–Q22 corresponds to those shown in FIG. 9 for transistors Q8 and Q16–Q18.

For transmission line lengths below 40db (at the 152kHz pilot frequency) the base-emitter voltages of transistors Q8 and Q16–Q22 will be less positive than the 0.7 volt reference, and for transmission line lengths greater than 40db (at the 152kHz reference) the base-emitter voltages of transistors Q8 and Q16–Q22 will be more positive than the 0.7 volt reference.

As shown in FIG. 10, the collector current curves for transistors Q8 and Q16–Q22 vary linearly with respect to signal loss. The collector current for each of these transistors thus increases as the measured transmission line length increases.

For transmission line lengths less than 40db at the 152kHz pilot frequency the collector currents of transistors Q8 and Q16–Q22 will be less than the 1mA reference current, and for transmission line lengths greater than 40db at the 152kHz pilot frequency the collector currents of transistors Q8 and Q16–Q22 will be more positive than the 1mA reference. The slopes of the collector current curves for transistors Q8 and Q16–Q22 vary according to their associated carrier frequencies. The collector current curve for transistor Q8 thus has the greatest slope, being associated with the 152kHz pilot frequency, while the collector current curve for transistor Q16 has the least slope, being associated with the 8kHz channel carrier signal.

If desired any one or more of the transmission lines for sub-systems 21–26 may be extended by repeatered extension (not shown) to service subscribers located more distantly from the central office than the subscribers who are served by the station carrier equipment in subscriber terminal unit 52. In this fashion, all eight channels of a selected one of the sub-systems 21–26 may be extended. Alternatively fewer than all eight channels of a given carrier sub-system may be extended.

The repeatered extension may conveniently be accomplished by locating a repeater at unit 52 for one of the carrier sub-systems to feed a transmission line extension and by removing the subscriber terminal circuits (e.g., terminal circuits STU1-STU8) from unit 52 and locating them at a more remote subscriber terminal unit (not shown) at the remote end of the transmission line extension. The remote subscriber terminal unit would additionally be equipped with a pilot carrier receiver and a level coordination control circuit corresponding identically to receiver 131 and circuit 132 respectively. In this manner, level coordination of the carrier signals transmitted from the remote unit is achieved.

From the foregoing description of the oscillator level control circuit 350 it will be appreciated that circuit 350 automatically causes the peak amplitude ($v_p$) of the oscillator output signal to track the reference voltage $V_{REF}$, which will vary as a function of the base-emitter voltage of transistor Q8 in the manner previously described. It also will be noted that the variable width current pulses which are developed to charge capacitor 358 in circuit 350 will have a repetition frequency equal to that of the oscillator's operating frequency.

It will be appreciated that the automatic carrier level coordination control circuitry described herein may be used in trunk carrier systems as well as station carrier systems (sometimes called subscriber carrier systems).

In the illustrated embodiment, the pilot carrier signals are advantageously employed in a novel synchronous ring detection circuit which minimizes bell tapping and which eliminates the need for a bandpass ringing signal filter in each of the subscriber terminal circuits.

To accomplish the synchronous ring detection, each of the line drive units 34 and 34a–34e is equipped with a modulator as indicated at 450 in FIG. 2 for modulating the pilot carrier signal from oscillator 134 with a ringing signal of pre-selected frequency (e.g., 750Hz) from an oscillator 452 (see FIG. 1A). In each line driver unit 34 and 34a–34e, the output of modulator 450 is fed to the input side of amplifier 35. Oscillator 452 is connected to the modulator 450 in each line driver unit 34 and 34a–34e and also to each of the central office terminal circuits (COT1–COT8, etc.) by way of signal lines that are indicated at U in FIG. 1A.

Oscillator 452 is normally turned off, but is turned on in a manner to be described shortly in response to an incoming call for any of the subscribers served by the communication system 20. When oscillator 454 is turned on, its 750Hz signal is fed to the modulator 450 in each of the line driver units 34 and 34a–34e. As a result, all six of the 152kHz pilot carrier signals applied to transmission lines 32 and 32a–32e will be modulated by the 750Hz ringing signal from oscillator 452. This modulation is transmitted to the subscriber terminal equipment and is there utilized in a manner to be described presently to signal an incoming call to a particular subscriber.

When a call arrives at the central office 33 for any one of the subscribers serviced by the communication system 20, the central office equipment 48 operates in the conventional manner to apply to the central office terminal circuit that is assigned to the called subscriber. The central office ringing voltage may, for example, be 20Hz and has the usual ringing and silent intervals.

Each of the central office terminal circuits (COT1–COT8, etc.) is equipped with a ringing detector circuit as indicated at 454 in FIG. 3. The 20Hz central office ringing signal is fed through drop circuit 75 to the detector circuit 454 in the called party's central office terminal circuit.

The detector circuit 454 in each of the central office terminal circuits (COT1–COT8, etc.) is connected to a ring start circuit 456 (see FIG. 1A) by way of a signal line T. Ring start circuit 456 is common to all of the central office terminal circuits COT1–COT8, etc.) in the central office terminal unit 50 as shown.

Each detector circuit 454 is responsive to the incoming 20Hz central office ringing signal, when fed to its associated central office terminal circuit, to apply a turn-on voltage to ring start circuit 456. The ring start circuit 456 responds to the turn-on voltage from the detector circuit 454 in any one of the central office terminal circuits (COT1–COT8, etc.) to apply power to oscillator 452, thus turning on the oscillator.

The 750Hz signal tone of oscillator 452 will now be fed back by way of lines u, to the ring detector circuits 454 in all of the central office terminal circuits (COT1–COT8, etc.). However, only the detector circuit 454 in the called party's central office terminal circuit will be conditioned by the incoming 20Hz central office ringing signal to gate the 750Hz signal tone to the transmit modulator 64 in the called party's central office terminal circuit.

As a result, the channel carrier signal transmitted from the called party's central office terminal circuit will be modulated by the 750Hz signal tone from oscillator 452. Because of the absense of the 20Hz ringing signal in the remaining central office terminal circuits, the ringing detector circuits in the central office terminal circuits of the uncalled subscribers will block application of the 750Hz signal tone to their modulators 64.

Therefore, only the called subscriber's information channel carrier signal will be modulated by the 750Hz tone from oscillator 452. At the same time, all of the pilot carrier signal on lines 32 and 32a–32e will be modulated by the 750Hz signal tone from oscillator 452 in the manner previously described.

The 750Hz modulation on each of the 152kHz pilot carrier signals will be continuous. The 750Hz modulation on each called party's information channel carrier signal, however, will have the usual ringing and silent intervals corresponding to that of the 20Hz central office ringing signal. This is accomplished by operation of detector circuit 454 in response to the applied 20Hz central office ringing signal in a manner to be described in detail later on.

The transmitted 750Hz modulation on the received pilot carrier signal at the subscriber terminal unit will be passed by the active low pass filter 190 in receiver 131. The upper cutoff of filter 190 may be set at about 3000Hz. Filter 190 may have a lower cutoff of about 300Hz. The 750Hz signal tone will therefore be recovered along with any other audio frequencies that may have inadvertently been modulated onto the received 152kHz pilot carrier signal. It is evident, however, that the only modulation of interest is the 750Hz tone and that any other modulation on the received pilot carrier is the result of undesirable noise or interference. The presence of other audio signals along with the 750Hz tone will not affect the ringing operation because the 750Hz signal is synchronously detected in a manner to be described shortly.

The recovered 750Hz signal tone is fed to a comparator 462 in receiver 131. Comparator 462 squares the 750Hz signal tone in preparation for the synchronous detection operation in the called subscriber's subscriber terminal circuit. Since all six of the pilot carrier signals on transmission lines 32 and 32a–32e will be modulated by the 750Hz tone from oscillator 452, the 750Hz tone will be recovered in receiver 131 regardless of the particular pilot carrier that the search and lock circuit 133 is locked with.

From the comparator 462 the recovered 750Hz signal tone is distributed by way of signal lines 464 to one of the two signal inputs of a synchronous detector 466 (see FIG. 4) in each of the subscriber terminal circuits (STU-1–STU8, etc.) in terminal unit 52. The other signal input of detector 466 is connected to the output of the low pass filter 81 in the subscriber terminal receiver 58. Each of the subscriber terminal circuits (STU1–STU8, etc.) is additionally equipped with a ring gate and ring disable circuit 468 and an on-off hook sense circuit 470 as shown in FIG. 4.

The 750Hz modulation that is transmitted on the called subscriber's information channel carrier signal will be recovered at the output of the detector 80 and will be passed by the low pass filter 81 in the called subscriber's subscriber terminal circuit. Accordingly, a call arriving at the central office for one of the subscribers serviced by the communication system 20 will result in the application of two in-phase 750Hz signal tones at the signal inputs of the synchronous detector 466 in the called subscriber's subscriber terminal circuit.

Synchronous detector 466 may be of any suitable circuit design to produce a rectification of the incoming 750Hz signalling tone only under conditions where the 750Hz signalling tone is present at both of the detector's signal inputs and where the two 750Hz signals at the detector's two signal inputs are either in phase with each other or 180° out of phase with each other. The recitifed output of detector 466 will have a d.c. component.

The detected 750Hz signal tone at the output of detector 466 is applied to charge a capacitor 472 (see FIG. 4) which is connected to the detector's output. The voltage built up on capacitor 472 by the recitified 750Hz signal will be positive in this embodiment and is applied to ring circuit 468. Ring circuit 468 may be of any suitable circuit design and may comprise a transistor switch Q30 (see FIG. 15) that is turned on by the positive voltage on capacitor 472 to gate a ring signal of preselected frequency (e.g., 20Hz) from a local ring generator 472 to the drop circuit 90. From drop circuit 90 the local 20Hz ring signal is fed by way of the called subscriber's drop 44 to ring the subscriber's telephone. Because the 750Hz signal tone recovered at the output of detector 80 has ringing and silent intervals corresponding to that of the 20Hz central office ringing signal, the rectified output of detector 466 will be intermittent. The ring switch 468 is therefore turned on and off in accord with the ringing and silent intervals to cause the intermittent ringing of the subscriber's telephone.

If the 750Hz signal tone is not present at either or both of the signal inputs of the synchronous detector 466, the signal tone will not be detected, and no d.c. component will be produced at the output of the synchronous detector. It is extremely unlikely that the presence of other VF components at the output of filter 81 or noise signals at the signal inputs of detector 466 will inadvertently produce a rectified output because the signals fed to the two inputs of the synchronous detector are required to be matched in phase and frequency long enough to charge capacitor 472 to a voltage that is high enough to operate ring circuit 468.

Considering the operation of the synchronous ring detection arrangement just described, it will be assumed that an incoming call arrives at the central office for the subscriber who is serviced by terminal circuits COT1 and STU1. For such an incoming call, the 20Hz central office ringing signal voltage will be applied only to the detector circuit 454 in the central office terminal circuit COT1 to thereby activate the detector circuit 454 in terminal circuit COT1. Assuming that this is the only incoming call for the subscriber serviced by communication system 20, than none of the other detector circuits 454 in the remaining central office terminal circuits will be activated.

Upon being activated by the 20Hz central office ringing voltage, the detector circuit 454 in terminal circuit COT1 will apply a turn-on voltage to ring start circuit 456, causing the latter to turn on oscillator 452. As a result, the oscillator's 750Hz signal tone is applied to modulate all six of the pilot carrier signals on lines 32 and 32a–32e and is additionally applied to the detector circuits 454 in all of the central office terminal circuits (COT1–COT8, etc.). Only the detector circuit 454 in terminal circuit COT1, however, is conditioned by the 20HZ central office ringing voltage to gate the 750Hz signal tone to its associated modulator. As a result, the only information channel carrier signal to be modulated by the 750Hz signal tone will be the one transmitted from terminal circuit COT1.

The 750Hz modulation on the information carrier channel that is transmitted from the central office terminal circuit COT1 will be recovered at the output of detector 80 in the subscriber terminal circuit STU1. The recovered 750Hz tone is passed by the low pass filter 81 to one input of the synchronous detector 466 in terminal circuit STU1. At the same time, the 750Hz modulation is recovered in receiver 131 from the pilot carrier with which the search and lock circuit 133 is locked and is fed to the other input of the synchronous detector 466 in terminal circuit STU1.

Since the 750Hz signal tone is simultaneously applied to both inputs of the detector 466 in terminal circuit STU1, the synchronous detector will detect the 750Hz signal. None of the other synchronous detectors in the remaining subscriber terminal circuits will detect the 750Hz signal because the modulated channel carrier signal from the central office terminal circuit COT1 is received only by the companion subscriber terminal circuit STU1.

As a result of detecting the 750Hz signal, the ring circuit 468 in terminal circuit STU1 is operated to thereby ring the called subscriber's telephone.

When the called subscriber removes his telephone to the off-hook state to answer the call, current will flow in the called party's drop circuit 90. On-off hook sense circuit 470, which may be of any suitable circuit design, is responsive to this current flow to feed a ring disable signal to ring circuit 468. Ring circuit 468 responds to the ring disable signal to terminate the supply of the ring generator's 20Hz ring signal to the subscriber's telephone.

The on-off hook sense circuit may also be employed to turn on the modulator 88 in the called subscriber's subscriber terminal circuit for signalling the central office that the call has been answered. For such an operation the modulators 88 in all of the subscriber terminal circuits (STU1–STU8, etc.) in unit 52 are normally turned off. Upon turning the modulator on in the subscriber's terminal circuit, the subscriber's carrier signal is transmitted up the transmission line to unit 52. The transmitted carrier is detected in the called party's central office terminal. Conventional unshown equipment in the central office terminal is operated by the detected carrier signal to feed a signal to the central office equipment 48 to cause the central office equipment to remove the 20Hz central office ringing signal from the detector circuit 454 in the called subscriber's central office terminal circuit.

When this happens, the detector circuit 454 blocks the supply of the 750Hz tone to the modulator 64 in the called subscriber's central office terminal circuit. Additionally, it will cause the ring start circuit 455 to turn off oscillator 452 if there are no other calls coming into the central office for any of the other subscriber's served by the communication system 20. As a result, the 750Hz modulation will be removed from the pilot carrier signals.

From the foregoing description it will be appreciated that the pilot carrier signals will be modulated by the 750Hz signal tone only when any one or more of the 48 channels in the communications system 20 is ringing. This feature reduces bell tapping. Bell tapping is also minimized during ringing (i.e., when the pilot carriers are modulated by the 750Hz signal tone) because transients are required to be within a relatively narrow passband of about 5Hz in order to pass into the subscriber terminal equipment to create a condition for bell tapping.

The synchronous ring detection circuit also advantageously eliminates the need for equipping the subscriber terminal circuits with tuned bandpass filters which customarily are designed with one or more large, costly coils for recovering the 750Hz tone.

Figure 14:
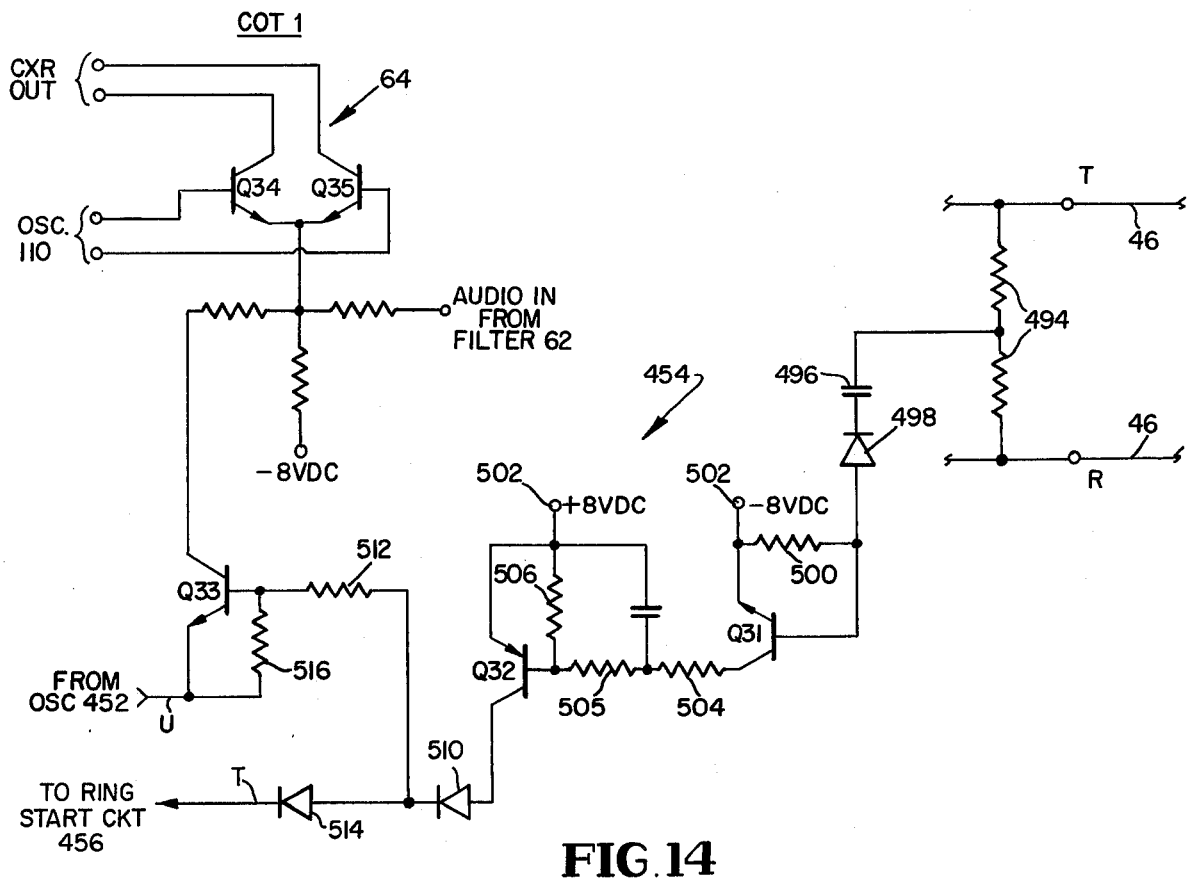
FIG. 14 is a schematic circuit diagram of the ring detector circuit shown in FIG. 3.

Referring to FIG. 14, one suitable design of ring detector circuit 454 in each central office terminal circuit (COT1-COT8, etc.) is shown to comprise transistors Q31, Q32 and Q33. The 20Hz ringing voltage from the central office equipment 48 is applied to either the tip and ring terminals T and R of the called subscriber's central office terminal circuit. The other of the two terminals will be grounded. A resistive voltage divider 494 is connected across the terminals R and T to eliminate ringing polarity. Divider 494 feeds a capacitor 496.

Capacitor 496 couples the a.c. component of the 20Hz central office ringing signal through a Zener diode 498 and a resistor 500 to the negative terminal of a suitable d.c. voltage source 502. The positive pulses of the 20Hz ringing signal are therefore developed across resistor 500.

Transistor Q31 has its emitter connected to the negative terminal of source 502. Resistor 500 is connected between the base and emitter of transistor Q31 as shown.

The positive pulses of the 20Hz ringing signal are therefore applied to the base of transistor Q31 to cause the transistor to conduct. When transistor Q31 conducts, its collector current flows through resistors 504, 505 and 506 to bias transistor Q32 into conduction.

As shown, resistors 504-506 are connected in series between the collector of transistor Q31 and the positive terminal of source 502. The emitter of transistor Q32 is connected to the positive terminal of source 502, and the base of transistor Q32 is connected to the junction between resistors 505 and 506. A capacitor 508 keeps transistor Q32 in conduction through the negative cycles of the 20Hz ringing signal.

Still referring to FIG. 14, the collector of transistor Q32 is connected by way of a diode 510 and a resistor 512 to feed the base of transistor Q33. The collector of transistor Q32 is also connected by way of diode 510 and a further diode 514 to the ring start circuit 456 for applying the turn-on voltage to circuit 456.

The 750Hz oscillator 452 is connected by way of signal line U to feed its 750Hz tone to the emitter of transistor Q33. A resistor 516 is connected between the base and emitter of transistor Q33 as shown.

The collector of transistor Q33 feeds the modulator 64 in its central office terminal circuit. Modulator 64 may be of the same type as modulator 88 and is shown to comprise a pair of emitter coupled transistors Q34 and Q35. The audio from filter 62 is fed to the coupled emitters of transistors Q34 and Q35 to modulate the carrier frequency oscillator signal which is differentially applied to the bases of transistors Q34 and Q35.

The collector of transistor Q33 also feeds the coupled emitters of transistors Q34 and Q35 so that when transistor Q33 conducts it will feed the 750Hz tone from oscillator 452 to the coupled emitters of transistors Q34 and Q35 to modulate the carrier frequency waveform. The output of modulator 64 is taken from the collectors of transistors Q34 and Q35 for transmission to the subscriber terminal unit 52. In the case of terminal circuit COT1, the carrier signal supplied by oscillator 110 will be modulated by the 750Hz and will be transmitted over line 32 for reception by the subscriber terminal circuit STU1.

From the foregoing it will be appreciated that when the 20Hz central office ringing signal is applied to the tip and ring terminals of the called subscriber's central office terminal circuit, transistor Q31 conducts on the ringing signal's positive alternations to cause conduction of transistor Q32. When transistor Q32 conducts it causes conduction of transistor Q33 and feeds the turn-on signal to ring start circuit 456. Ring start circuit 456 turns oscillator 452 on, and transistor Q33 will feed the 750Hz tone to modulate the called subscriber's channel.

Transistor Q33 will conduct throughout each ringing interval of the 20Hz central office ringing signal and will be turned off during the silent intervals of the 20Hz ringing signal. The carrier transmitted from modulator 64 will therefore be intermittently modulated by the 750Hz tone.

Figure 16:
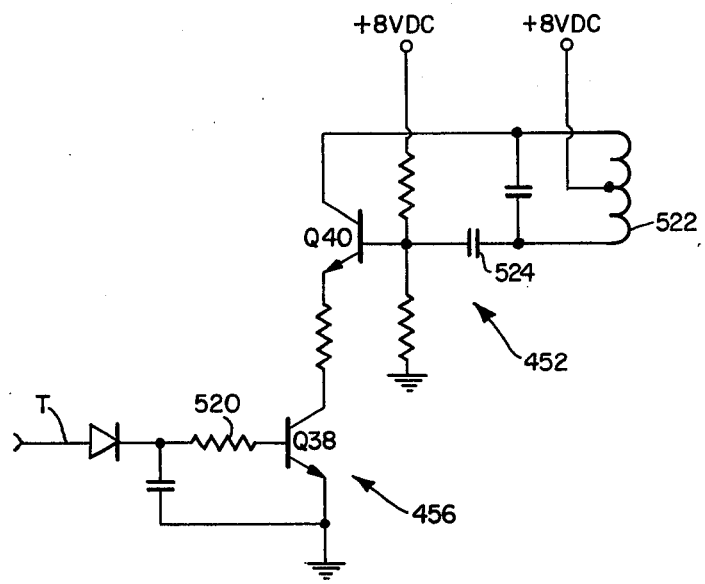
FIG. 16 is a schematic circuit diagram of the ring start circuit and the 75 Hz oscillator shown in FIG. 1A.

The positive turn-on voltage developed by causing transistor Q32 to conduct is applied to the ring start circuit 456. Ring start circuit 456 may be of any suitable circuit design and is shown in FIG. 16 to comprise an NPN transistor Q38 which is connected through a base resistor 520 and lines T to the ring detector diodes 514 in the central office terminal circuits (COT1-COT8, etc.).

Oscillator 452 may be of any suitable circuit design and is shown to be of the Hartley feedback type having an NPN amplifying transistor Q40, a waveforming network 522 and a positive feedback 524. Network 522 is in the collector circuit of transistor Q40. The emitter of transistor Q38 is grounded, and the collector of transistor Q38 is connected through a resistor 526 to the emitter of transistor Q40.

When the ring detector transistor Q32 in any one of the central office terminal circuits (COT1-COT8, etc.) is turned on it applies a positive turn-on voltage to the base of transistor Q38, causing transistor Q38 to conduct. When transistor Q38 conducts it feeds emitter current to transistor Q40, causing the 750Hz signal to be developed across the oscillator's waveforming network 522.

When the positive voltage is removed from the base of transistor Q38, transistor Q38 turns off to terminate the supply of emitter current to transistor Q40. As a result, no a.c. waveform will be developed across network 522, and oscillator 452 will effectively be turned off.

Figure 15:
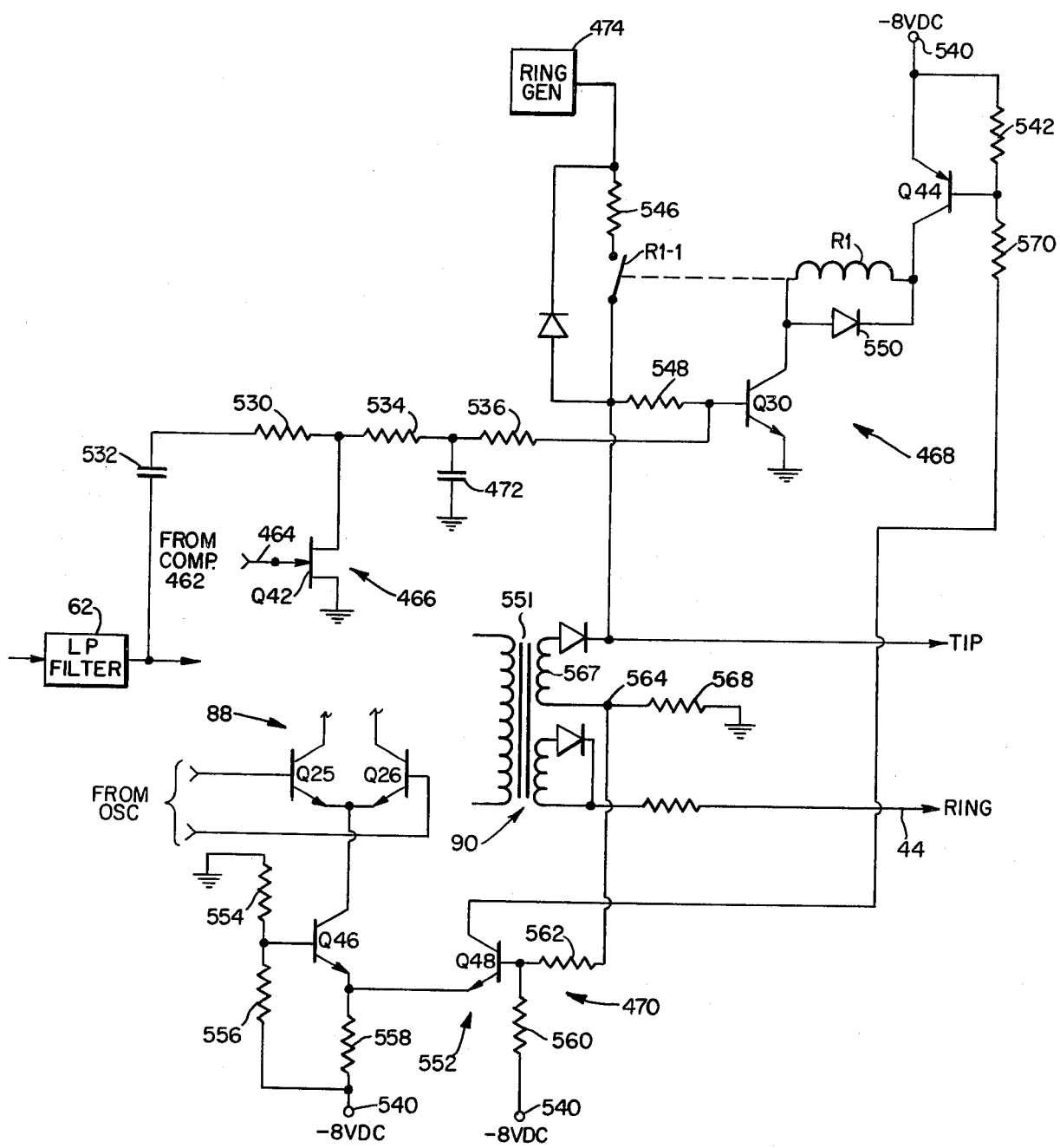
FIG. 15 is a schematic circuit diagram of the synchronous detector, the ringing circuit and the on-off hook sense circuit shown in FIG. 4.

Referring to FIG. 15, the synchronous detector 466 in each of the subscriber terminal circuits (STU1—STU8, etc.) may comprise a field effect transistor Q42. Transistor Q42 has its source connected to ground, its drain connected by way of a resistor 530 and a coupling capacitor 532 to the output of filter 62, and its gate connected by way of line 464 to the output of comparator 462. The drain of transistor Q42 is also connected by way of resistors 534 and 536 to feed the base of transistor Q30 in the ring circuit 468.

The 750Hz squarewave fed from comparator 462 cyclically turns transistor Q42 on and off, thus alternately grounding and opening the junction between resistors 530 and 534. If the 750Hz signal is present at the output of filter 62 as well as at the output comparator 462 and if both signals are synchronous (i.e., in phase) the result will be a positive half-wave recification which charges capacitor 472. When sufficient positive voltage is built up on the upper plate of capacitor 472, transistor Q30, which is normally off, will be driven into conduction. Capacitor 472 sets the bandwidth for detector 466 to prevent false ringing.

As shown in FIG. 15, the emitter of transistor Q30 is grounded, and the collector of transistor Q30 is connected through the coil of a ring relay R1 to the collector of a ring disable transistor Q44. Transistor Q44 and relay R1 form a part of ring circuit 468.

Transistor Q44 is a PNP type, having its emitter connected to the positive terminal of a suitable d.c. voltage source 540. The base of transistor Q44 is also connected through a resistor 542 to the positive terminal of source 540. Transistor Q44 is normally conducting except when the subscriber's telephone is off-hook. Transistor Q44 provides a local ring trip function as will be described in greater detail shortly.

The output of the local ring generator 474 is connected by way of a resistor 546 and a set of normally open contacts R1-1 of relay R1 to the tip terminal of the subscriber drop circuit 90. The tip and ring shown in FIG. 15 are connected to the subscriber's telephone 42.

With the ring circuit thus far described, it is clear that when the subscriber's telephone 42 is on-hook and when the 750Hz tone is synchronously detected by detector 466 to signal an incoming call, transistor Q30 will be turned on by the recitified, positive output of detector 466 to operate relay R1. Contacts R1-1 will therefore close to feed the ring signal from generator 474 to the subscriber's telephone, thus ringing the telephone. The ringing voltage supplied by generator 474 may be a 20Hz square wave voltage which only goes positive. A relatively large resistor 548 is connected between the base of transistor Q30 and the tip terminal of the drop circuit boosts the base drive to transistor Q30 when the applied ringing voltage is positive.

Diode 550 is connected across the coil of relay R1 to protect transistors Q30 and Q44 from voltage transients. Drop circuit 90 is shown to comprise a transformer 551 in FIG. 15.

The on-off sense circuit 470 may be of any suitable design and is shown in this embodiment to comprise a differential comparator 552 (see FIG. 15). Comparator 552 is formed by a pair of emitter coupled NPN transistors Q46 and Q48.

As shown in FIG. 15, a pair of resistors 554 and 556 form a voltage divider and are connected in series between ground and the negative terminal of source 540 to establish a pre-selected, fixed reference voltage on the base of transistor Q46. An emitter resistor 558 is connected between the negative terminal of source 540 and the coupled emitters of transistors Q46 and Q48. The emitter bias current supplied by resistor 558 will be conducted by either one of the transistors Q46 and Q48. The collector of transistor Q46 feeds the coupled emitters of transistors Q25 and Q26 in modulator 88. When transistor Q46 conducts, it supplies the emitter bias current to transistors Q25 and Q26 to turn the modulator on.

Still referring to FIG. 15, circuit 470 further comprises a pair of resistors 560 and 562 which are connected in series between the negative terminal of source 540 and the terminal 564 of one of the secondary windings 567 of the drop circuit's transformer 551. A further resistor 568 is connected between terminal 564 and ground.

The base of transistor Q48 is connected to the junction between resistors 560 and 562. Resistors 560 and 652 form a voltage divider for biasing transistor Q48. The collector of transistor Q48 is connected through a further resistor 570 and resistor 542 to the positive terminal of source 540 as shown. The base of transistor Q44 is connected to the junction between resistors 542 and 570 and is biased by the voltage divider action of the resistors.

Resistor 568 is relatively small (e.g., 30 ohms) so that when the subscriber's telephone is on-hook and, hence, when no direct current is flowing in windings 567, terminal 546 will be nearly at ground potential. Resistors 560 and 562, which bias transistor Q48, are so sized that when terminal 564 is nearly at ground potential, the biasing voltage applied to the base of transistor Q48 will be more positive than the fixed reference voltage on the base of transistor Q46.

Transistor Q48 will therefore be on to conduct all of the emitter current supplied through resistor 558, and transistor Q46 will be turned off. The current conducted by transistor Q48 will be steered through resistors 570 and 542 to provide the base bias for maintaining transistor Q44 in conduction.

Thus, when the subscriber's telephone is on-hook, transistors Q44 and Q48 will be conducting and transistor Q46 will be turned off. Modulator 88 will therefore be turned off so that no carrier signal is transmitted. When the subscriber's telephone is transferred to its off-hook state, significant current flows in resistor 568, causing the voltage at terminal 564 to become appreciably negative. When this happens, the voltage on the base of transistor Q48 becomes more positive than the fixed reference voltage on the base of transistor Q46.

The current through resistor 558 will therefore be steered through transistor Q46, which is now conducting, and transistor Q48 will turn off. When transistor Q46 conducts, current is supplied from its collector to turn on the modulator 88. The carrier signal will now be transmitted up the transmission line for detection in the companion central office terminal circuit. To signal the central office equipment that an incoming call has been answered, each central office terminal circuit (COT1—COT8, etc.) may be equipped with a switching transistor (not shown) having its base connected to the output of filter 71 so that it will be turned on by the detection of the channel carrier signal that is transmitted by turning on the modulator 88 in the companion subscriber terminal circuit. The unshown switching transistor may serve to complete a circuit for operating an unshown relay, and upon being in operation, the unshown relay places a resistance of pre-selected value across the ring and tip terminals of the central office terminal circuit to develop the signal that conditions the central office equipment 48 to remove the 20Hz ringing signal from the called subscriber's central office terminal circuit.

By turning transistor Q48 off in ring circuit 468, its collector current will stop flowing with the result that transistor Q44 turns off to open the energizing circuit for relay R1. Relay R1 therefore drops out to open contacts R1-1 and thus to locally trip the ring by disconnecting generator 474 from the subscribers's telephone.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured as Letters Patent is:

1. A plural channel amplitude modulated station carrier telephone system comprising subscriber terminal means providing service to a plurality of subscribers and adapted to be connected to the subscribers' telephones, said subscriber terminal means including a plurality of signal-responsive circuits corresponding in number to said plurality of subscribers and each assigned to a different one of said subscribers for ringing the assigned subscriber's telephone, and signalling means including circuit means at said subscriber terminal means, said signalling means being responsive to an incoming call for any one of said subscribers to apply two separate synchronized signals of the same preselected frequency to the signal-responsive circuit that is assigned to the called subscriber, each of said signal-responsive circuits having (a) a synchronous detector rendered effective by one of said two signals for synchronously detecting the other of said two signals and (b) means responsive to the synchronous detection of the other of said signals by said detector for applying a ringing signal to cause ringing of its assigned subscriber's telephone.

2. A method of signalling an incoming call to a subscriber serviced by a plural channel amplitude modulated station carrier telephone system, comprising the steps of transmitting a pilot carrier signal from a central office, transmitting from the central office a plurality of frequency division multiplexed channel carrier signals each assigned to a different one of the subscribers served by the station carrier telephone system, modulating both the pilot carrier signal and the channel carrier signal assigned to the subscriber being called with a signalling tone of pre-selected frequency, separately recovering the signalling tone modulations from the transmitted pilot and channel carrier signals, utilizing the recovered signalling tones to synchronously detect one of the signalling tones, and causing the called subscriber's telephone to be rung in response to the synchronous detection of said one of said recovered tones.

3. A plural channel amplitude modulated station carrier telephone system providing service to the telephones of a plurality of subscribers and comprising means located at a central office for transmitting a plurality of frequency division multiplexed channel carrier signals, each of said channel carrier signals being assigned to a different one of said telephones, means at said central office for amplitude modulating each channel carrier signal with a voice frequency intelligence signal, a plurality of subscriber transmitting and receiving terminal circuits, transmission line means providing for the transmission of the channel carrier signals to said subscriber terminal circuits, each of said subscriber terminal circuits having a receiver tuned to receive a different pre-selected one of said channel carrier signals and adapted to be connected to the telephone that the channel carrier signal if assigned to, , means at said central office for transmitting a pilot carrier signal over said transmission line means, means responsive to an incoming call for any one of said subscribers for modulating both of said pilot carrier signal and the channel carrier signal assigned to the called subscriber's telephone with a ringing signal of pre-selected frequency, pilot carrier signal receiver means located at the end of said transmission line means remote from said central office for receiving said pilot carrier signal and having a circuit for demodulating said pilot carrier signal and for recovering the ringing signal modulated thereon, the receiver of each of said subscriber terminal circuits having (a) first circuit means for demodulating the received one of said channel carrier signals and recovering the ringing signal modulated thereon, (b) a synchronous detector electrically connected to said circuit of said pilot carrier receiver means and to the first circuit means for synchronously detecting the ringing signal recovered by said circuit of said pilot carrier signal receiver means and said first circuit means, and (c) further circuit means electrically connected to the synchronous detector and responsive to the synchronous detection of said ringing signal by the synchronous detector for ringing the called subscriber's telephone .

4. A plural channel amplitude modulated station carrier system for serving a plurality of subscribers and comprising a plurality of first terminal circuits located at a central office and each having a transmitter for transmitting one of a plurality of frequency division multiplexed channel carrier signals corresponding in number to the number of said first terminal circuits, each of the channel carrier signals being assigned to a different one of said subscribers to provide service for the associated subscriber, means located at said central office for providing an additional carrier signal of pre-selected frequency that is different from the frequencies of said channel carrier signals, a plurality of subscriber transmitter and receiver terminal circuits located remotely from said central office and adapted to be connected to the subscriber's telephones, signal receiver means located remotely from said central office, signal transmission means for transmitting said channel carrier signals to said subscriber terminal circuits and said additional carrier signal to said receiver means, means at said central office for supplying an a.c. ringing signal of pre-selected frequency, means for modulating said additional carrier signal with said ringing signal, each of said first terminal circuits having means for modulating its channel carrier signal with said ringing signal in response to an incoming call for the subscriber served by its channel carrier signal, said signal receiver means being tuned to receive said additional carrier signal and having a circuit for recovering the ringing signal modulated onto said additional carrier signal, and each of said subscriber terminal circuits being tuned to receive a different pre-selected one of said channel carrier signals and including (a) means for demodulating the received one of said channel carrier signals (b) means for filtering the signal components resulting from the demodulation of the received one of said channel carrier signals by said demodulating means to recover the ringing signal when it is modulated onto the received channel carrier signal, (c) a synchronous detector electrically connected to said filtering means and to said circuit of said signal receiver means for synchronously detecting said ringing signal whenever it is simultaneously modulated onto the received one of said channel carrier signals, and said additional carrier signal, and (d) means responsive to the detection of said ringing signal by said synchronous detector for ringing the telephone of the subscriber served by the received channel carrier signal.

* * * * *